(12) United States Patent
Berning et al.

(10) Patent No.: US 10,724,186 B2
(45) Date of Patent: *Jul. 28, 2020

(54) EARTH WORKING MACHINE WHOSE ROTATABLE WORKING APPARATUS, FOR INSTALLATION ON THE MACHINE, IS CONVEYABLE INTO ITS OPERATING POSITION USING AN ONBOARD ACTUATOR

(71) Applicant: Wirtgen GmbH, Windhagen (DE)

(72) Inventors: Christian Berning, Zülpich (DE); Karsten Buhr, Willroth (DE); Markus Frankemölle, Hennef (DE); Thomas Lehnert, Oberraden (DE); Andreas Salz, Neustadt (DE); Hardy Wilhelmi, Dattenberg (DE)

(73) Assignee: Wirtgen GmbH (DE)

( * ) Notice: Subject to any disclaimer, the term of this patent is extended or adjusted under 35 U.S.C. 154(b) by 156 days.

This patent is subject to a terminal disclaimer.

(21) Appl. No.: 15/981,015

(22) Filed: May 16, 2018

(65) Prior Publication Data

US 2018/0340299 A1   Nov. 29, 2018

(30) Foreign Application Priority Data

May 23, 2017   (DE) .................. 10 2017 208 777

(51) Int. Cl.
*E01C 23/08* (2006.01)
*E01C 23/12* (2006.01)
(Continued)

(52) U.S. Cl.
CPC .......... *E01C 23/088* (2013.01); *E01C 23/127* (2013.01); *B23C 1/007* (2013.01); *B23C 1/027* (2013.01); *B23Q 1/28* (2013.01)

(58) Field of Classification Search
CPC ..... E01C 23/088; E01C 23/127; B23C 1/007; B23C 1/027; B23Q 1/28; A01B 33/08; A01B 33/142

See application file for complete search history.

(56) References Cited

U.S. PATENT DOCUMENTS

| 4,704,045 A | 11/1987 | Taylor et al. |
| 9,234,320 B2 | 1/2016 | Abresch et al. |

(Continued)

FOREIGN PATENT DOCUMENTS

| DE | 3911947 A1 | 2/1990 |
| DE | 4037448 A1 | 5/1992 |

(Continued)

OTHER PUBLICATIONS

EPO Search dated Aug. 2, 2018 in related application EP 18 17 2040, 6 pages (not prior art).

(Continued)

*Primary Examiner* — Abigail A Risic
(74) *Attorney, Agent, or Firm* — Lucian Wayne Beavers; Patterson Intellectual Property Law, PC

(57) ABSTRACT

An earth working machine (10) includes a machine body (13) having a machine frame (12) and a drive configuration (46), rotationally drivable relative to the machine frame (12) around a drive axis (A), to which configuration a working apparatus (32) embodied for earth working is releasably connected in torque-transferring fashion, in an operating position operational for earth working, for rotation together around the drive axis (A), such that when the connection is released, the working apparatus (32) is removable from the operating position in an axial direction relative to the drive configuration (46) for deinstallation from the drive configuration (46) and, for installation on the drive configuration, is (Continued)

conveyable into the operating position in an axial direction relative to the drive configuration (46).

23 Claims, 11 Drawing Sheets

(51) Int. Cl.
  *B23C 1/00* (2006.01)
  *B23C 1/02* (2006.01)
  *B23Q 1/28* (2006.01)
  *E01C 23/088* (2006.01)
  *B23C 1/027* (2006.01)

(56) References Cited

U.S. PATENT DOCUMENTS

| | | |
|---|---|---|
| 2014/0333118 A1 | 11/2014 | Abresch et al. |
| 2017/0138004 A1* | 5/2017 | Berning ............... E01C 23/127 |
| 2018/0002876 A1* | 1/2018 | Hirman ................ E01C 23/127 |
| 2019/0024329 A1* | 1/2019 | Avans ..................... B28D 1/18 |
| 2019/0186088 A1* | 6/2019 | Bjorge ................. E01C 23/088 |

FOREIGN PATENT DOCUMENTS

| | | |
|---|---|---|
| DE | 102012008252 A1 | 10/2013 |
| DE | 102013208638 A1 | 11/2014 |

OTHER PUBLICATIONS

EPO Extended Search dated Jul. 18, 2018 in corresponding application EP 18 17 2039, 6 pages (not prior art).

EPO Search report dated Jul. 19, 2018 in related application EP 18 172 042.6, 6 pages (not prior art).

Co-pending U.S. Appl. No. 15/981,027, filed May 16, 2018 (not prior art).

Co-pending U.S. Appl. No. 15/981,035, filed May 16, 2018 (not prior art).

EPO search report dated Jul. 31, 2018 in related EP application 018172044.2-1002 (not prior art).

* cited by examiner

EARTH WORKING MACHINE WHOSE ROTATABLE WORKING APPARATUS, FOR INSTALLATION ON THE MACHINE, IS CONVEYABLE INTO ITS OPERATING POSITION USING AN ONBOARD ACTUATOR

BACKGROUND OF THE INVENTION

The present invention relates to an earth working machine, such as a road milling machine, recycler, stabilizer, or surface miner, encompassing a machine body having a machine frame and a drive configuration rotationally drivable relative to the machine frame around a drive axis that defines an axial direction, to which configuration a working apparatus embodied for earth working is releasably connected in torque-transferring fashion, in an operating position operational for earth working, for rotation together around the drive axis, such that when the connection is released, the working apparatus is removable from the operating position in an axial direction relative to the drive configuration for deinstallation from the drive configuration and, for installation on the drive configuration, is conveyable into the operating position in an axial direction relative to the drive configuration.

DE 10 2012 008 252 A1 of the species discloses an earth milling machine having a milling drum, rotatable around the drive axis of a drive configuration, constituting the working apparatus, the milling drum being rotatable around the drive axis only when the milling drum is in its operating position relative to the drive configuration and is connected thereto for rotation together around the drive axis.

The drive configuration of the known earth milling machine is located radially inside the milling drum when viewed with the known earth milling machine in the operational state. The milling drum is braced against the drive configuration at two bearing points located with an axial spacing between them, the bearing point located closer to the drive side forming, by means of a spur tooth set, a positively engaging coupling for torque transfer between the drive configuration and milling drum. On the drive side of the earth milling machine, a drive torque is transferred from the drive motor to the drive configuration. DE 10 2012 008 252 A1 discloses, without further detail, that the positively engaging coupling itself, i.e. the spur-toothed components of the machine body of the earth milling machine on the one hand and of the milling drum on the other hand which mesh with one another in the operational state, are intended to comprise a "pressure impingement device" for fluid pressure impingement upon the positively engaging coupling in order to separate the coupling halves. Separation of the positively engaging coupling halves is preferably to be accomplished pneumatically.

The earth milling machine known from DE 10 2012 008 252 A1 can furthermore comprise a cylinder/piston unit so as to push the milling drum, with this unit, out of the positive coupling engagement toward a non-locating bearing of the milling drum. The non-locating bearing is constituted in the region of the bearing point located farther from the drive side.

Beyond simply reciting the means to be used, however, DE 10 2012 008 252 A1 provides no indications at all as to how the pressure impingement device should be configured, where it and/or the piston/cylinder unit might be located, and how they are to be brought into force-transferring engagement with one or both positively engaging coupling halves.

U.S. Pat. No. 4,704,045 A discloses an earth working machine, likewise in the form of an earth milling machine, whose milling drum constituting a working apparatus is axially clampable in torque-transferring fashion between two drive plates. The drive plates at the two axial end regions of the milling drum are each mounted on a side frame, each side frame of which is axially displaceable by means of hydraulic piston/cylinder units relative to a stationary machine frame of the earth milling machine known from U.S. Pat. No. 4,704,045 A. With the side frames axially displaceable in this fashion, the working engagement point at which the milling drum removes material from the ground can be displaced along the machine width. In addition, the milling drum can be unclamped from, and clamped into, its receptacle by displacing the side frames relative to one another.

DE 40 37 448 A1 discloses a road milling machine in which a milling drum is axially clamped in between a locating bearing located closer to the drive side of the road milling machine and a non-locating bearing arranged on a movable side plate of the machine body on the idle side, located oppositely from the drive side, of the road milling machine. The side plate carrying the non-locating bearing is connected to the machine frame, at a point at a distance from the non-locating bearing, by means of a hydraulic positioning cylinder. The non-locating bearing can be extended out of the milling drum, and pushed into the milling drum, by actuation of the positioning cylinder. Using a corresponding installation sequence it is even possible to ensure that firstly the milling drum, together with the non-locating bearing, is pulled off the locating bearing by actuation of the positioning cylinder, and only then, after release of a connection between the non-locating bearing and milling drum, can the non-locating bearing be pulled off the milling drum by further actuation of the positioning cylinder.

In the case of the positioning cylinder arranged remotely from the non-locating bearing, large installation moments unavoidably act at least on the bearing subassemblies involved during both deinstallation and installation of the milling drum, since a considerable load arm exists between the hydraulic positioning cylinder and the bearing components to be displaced by it.

The solution known from U.S. Pat. No. 4,704,045 A has the disadvantage that the hydraulic positioning cylinders that move the side frames must exert an axial force on the milling drum during the entire operation of the known earth milling machine in order to hold the drum in an axially clamped state. The considerable working reaction forces that occur at the earth working engagement point thus feed back into the hydraulic positioning cylinders. In addition, considerable moments occur here as well upon force transfer between the hydraulic positioning cylinders, arranged at a distance from the drive axis, and the milling drum bearing system.

SUMMARY OF THE INVENTION

The object of the present invention is to refine an earth working machine of the kind recited initially in such a way that upon a replacement of the working apparatus on the working machine, the working apparatus can be conveyed as simply and quickly as possible into the operating position while avoiding or at least reducing an installation moment load on the drive configuration.

In accordance with a very general approach to a solution, the present invention achieves the aforesaid object, in an earth working machine of the kind recited initially, by the fact that there is provided on the drive configuration an actuator that encompasses an actuator member, movable relative to the drive configuration, which, when the working apparatus is located, in preparation for installation thereof on the drive configuration, in a preparation position located axially remotely from the operating position, is conveyable directly, or indirectly with interposition of a coupling structure, into installation force-transferring engagement with a counterpart coupling structure of the working apparatus, the working apparatus being capable of being brought by the actuator, upon establishment of an installation force-transferring engagement, from the preparation position closer to the operating position.

Thanks to the arrangement of the actuator on the drive configuration, the load arm acting between the actuator and the working apparatus can be considerably shortened or even entirely eliminated, which considerably reduces or even completely eliminates the tendency of the working apparatus to become tilted when being pulled onto the drive configuration. A disadvantageous installation moment around a moment axis enclosing an angle, even a right angle, with the drive axis can thereby be reduced or eliminated. The force of the actuator can thus be utilized efficiently in order to bring the working apparatus, which has a large mass of often more than a ton, closer to its operating position.

In the existing art, this approach movement has often been produced by screwing in several retaining bolts that are to be arranged around the drive axis. Although the resulting load on the individual bolt is reduced by tightening a plurality of retaining bolts arranged with a distribution in a circumferential direction around the drive axis, the installation complexity for displacing the working apparatus axially toward its operating position is nevertheless considerable. In the existing art, the retaining bolts as a rule are screwed into the drive configuration; the shanks of the retaining bolts pass through passages in a flange portion of the working apparatus, and the heads of the retaining bolts clamp the flange portion toward the drive configuration.

The preparation position can be any relative position between the working apparatus and drive configuration, located axially remotely from the operating position, in which the installation force-transferring engagement between the actuator and working apparatus can be established. In order to perceptibly simplify the installation task, the preparation position is preferably at least 60 mm, more preferably at least 80 mm, particularly preferably at least 95 mm away from the operating position.

The actuator member can be conveyable directly into installation force-transferring engagement with a counterpart coupling structure of the working apparatus, for example if the actuator comprises a hook-shaped portion that can engage behind a component portion of the working apparatus. Installation force-transferring engagement of the actuator member with the working apparatus can, however, also be accomplished with interposition of a coupling structure that transfers force from the actuator member to the working apparatus. The coupling structure is preferably removable, and particularly preferably is arranged between the actuator member and working apparatus only for installation purposes.

In principle, in accordance with the basic idea of the present invention it is intended to be sufficient if the working apparatus is movable by the actuator axially from the preparation position toward its operating position. Depending on the conformation of the relative arrangement of the working apparatus and drive configuration when the working apparatus is in the operating position, a manual engagement before the operating position is reached may be necessary in order to make it possible at all for the working apparatus to reach its operating position on the drive configuration. For example, it may be necessary to align the working apparatus and the drive configuration with respect to one another after a phase of displacing the working apparatus. Provision is preferably made, however, that the working apparatus is conveyable by the actuator from the preparation position into the operating position. The actuator member must be capable, for that purpose, of traveling over at least a displacement distance corresponding to the spacing between the preparation position and the operating position.

In this preferred case, after operation of the actuator the working apparatus is located, relative to the drive configuration, in the operating position in which the working apparatus merely needs to be retained so that any departure from the operating position, for example due to reaction forces resulting from earth working, can be excluded. The working apparatus can be conveyable by the actuator from the preparation position into the operating position in several interrupted movement phases. Preferably, however, the displacement of the working apparatus into the operating position is accomplished in a single movement phase.

Unless otherwise stated in individual cases in the present Application, the earth working machine is described in the operational state. In that case the drive axis is the rotation axis of the working apparatus, so that the drive axis can also serve, in very general terms, as the basis of a polar coordinate system or cylindrical coordinate system for the working apparatus. The working apparatus thus extends from its drive axial end, which in the operational state is located closer to the site at which drive torque is introduced into the drive configuration, to its retention axial end located oppositely from the drive axial end, in the region of which the working apparatus is preferably retained, in the operating position, against axial displacement on the drive configuration.

To allow the working apparatus to be rotationally driven by the drive configuration in spatially compact fashion while preventing the drive configuration from interfering with working tools that are usually located on the radially outward-facing side of the working apparatus, provision is preferably made that the working apparatus radially externally surrounds the drive configuration both when the working apparatus is in the operating position and when the working apparatus is in the preparation position. Principally in the preparation position but also in the operating position, the drive configuration can project from a drive axial end, constituting one axial longitudinal end of the working apparatus, axially into the working apparatus.

With the working apparatus in the operational state, the drive configuration preferably does not project axially beyond its retention axial end, so that the working apparatus can be brought at its retention axial end as close as possible to the edge of the remainder of the machine body. That side of the earth working machine which is located axially closer to the drive axial end of the operational working apparatus is referred to as the "drive side," and the axially oppositely located machine side is referred to as the "idle side." The working apparatus preferably projects axially beyond the drive configuration on at least one side, for example with its retention axial end.

In this case the retention axial end of the working apparatus, located oppositely from the drive axial end, can be brought close to the idle side of the machine body so that a machine operator can orient him- or herself with respect to the idle side of the machine or machine body so that the earth working machine can be deliberately brought close to working boundaries for earth working.

The working apparatus preferably projects beyond the drive configuration axially on both sides in order to achieve a compact structure.

The drive configuration is usually coupled to a drive motor of the earth working machine, although the drive motor as a rule has a higher rotation speed than the rotation speed required at the drive configuration in the context of earth working as intended. A transmission that steps a rotation speed down, and thus steps torque up, is therefore usually operatively connected to the drive configuration. The drive configuration preferably encompasses part of the transmission housing of the transmission, and particularly preferably is coupled to a ring gear of the transmission for rotation together when the transmission is embodied in space-saving fashion as a planetary gearset. Because the drive configuration is radially externally surrounded by the working apparatus when the earth working machine is operational, drive torque is usually introduced into the drive configuration from one axial end of the drive configuration. The drive configuration therefore has an introduction longitudinal end located closer to the drive torque introduction location, and a longitudinal end axially opposite from the latter, located farther from the drive torque introduction location, which for differentiation from the introduction longitudinal end is also referred to hereinafter as the "functional" longitudinal end, since functions such as centering and/or torque transfer to the working apparatus and/or fastening of the actuator housing and/or energy supply to the actuator can be effected at that end.

The drive configuration is preferably immovable along the drive axis relative to the remainder of the machine body.

To allow the use of actuator members that are as short, and therefore as flexurally rigid, as possible, according to a preferred refinement of the present invention the drive configuration can encompass a cover closing off the drive configuration at the functional longitudinal end, the actuator housing preferably being fastened to the cover, for example by bolting. The cover can be embodied in several pieces or, to avoid a large number of components, preferably in one piece. The drive configuration preferably encompasses a tubular body, referred to hereinafter as an "internal tube" because of its placement radially inside the working apparatus, that the cover axially closes off, with the exception of any functionally important passages and openings, at the functional longitudinal end of the drive configuration.

The actuator housing and the actuator as a whole can be effectively protected from the external influences produced by earth working taking place physically close to the drive configuration if the actuator housing is arranged on that side of the cover which faces toward the introduction longitudinal end. In order for the working apparatus, or a component portion rigidly connected to it, to be accessible for force application by the actuator member, the cover can comprise a recess, passing axially through it, through which the actuator member can pass completely.

In order to reduce the weight and mass of the earth working machine without impairing the ability of the drive configuration to be installed, the tubular body can comprise a tubular portion and, at its longitudinal end located closer to the cover, a support ring, connected to the tubular portion, that has a greater radial thickness than the tubular portion. A connection, in particular a releasable connection, of the cover to the tubular body can then be established by connecting the cover directly to the support ring. In the interest of minimum weight, the tubular portion, which is preferably a cylindrical tubular portion, extends axially from the support ring to a transmission housing component to which the tubular portion is connected, preferably nonreleasably connected, at the functional longitudinal end of the drive configuration.

A connection is "releasable" for purposes of this Application when it is releasable without destroying components involved in the connection. A bolted connection or latching connection or clamp or a positive bayonet connection are examples of releasable connections. A nonreleasable connection, conversely, for example a welded or riveted connection, can be undone only by destroying the connection.

As has already been indicated above, the actuator member can in principle be arranged in pivotably movable fashion on an actuator housing or on an actuator base, the actuator member then preferably comprising a hook conformation with which the actuator member can engage behind the counterpart coupling structure of the working apparatus. Pivotably movable actuator members can, however, have a smaller axial movement space as compared with translationally movable actuator members. It is therefore preferred, in order to allow the longest possible distance to be traveled between the preparation position and a movement end position of the working apparatus, which is located closer to the operating position and preferably encompasses the operating position, that the actuator member be axially translationally movable relative to the drive configuration between a retracted and an extended position.

Preferably the actuator member is translationally movable at least 150 mm, more preferably at least 250 mm, between the retracted and the extended position, so that a reliable installation force-transferring engagement can easily be established.

The longitudinal axis of the actuator member is consequently preferably parallel to or even coaxial with the drive axis of the drive configuration on which the actuator is arranged.

A component portion connected rigidly to the working apparatus preferably comprises an actuator passthrough opening through which the actuator member passes at least in its extended position. This component portion can be a connecting flange of the working apparatus which is embodied to connect the working apparatus to the drive configuration for rotation together around the drive axis. This actuator passthrough opening is preferably adjacent to the counterpart coupling structure in order to simplify force transfer from the actuator member to the working apparatus. The counterpart coupling structure preferably extends entirely around the actuator passthrough opening in order to enable a force transfer between the actuator member and working apparatus over the largest possible area and thus with low area loads and as uniformly as possible.

A component portion connected rigidly to the working apparatus can be connected in one piece with the working apparatus or can be mounted on the working apparatus, preferably with zero clearance, as a separate component. The separate component can be connected nonreleasably to the working apparatus. For repair and maintenance purposes the connection to the working apparatus is preferably releasable, for example via a bolted connection.

It is not to be excluded that the actuator member already passes through the actuator passthrough opening in its retracted position, so that the actuator member protrudes farther beyond the component portion comprising the counterpart coupling structure in the extended position than in the retracted position; this simplifies the placement of the aforementioned coupling structure between the actuator member and counterpart coupling structure. Preferably, in its retracted position the actuator member does not pass through the actuator passthrough opening. The actuator member then merely projects axially from the drive configuration into the actuator passthrough opening without passing completely through it, or is completely pulled back out of it.

To clarify any doubts, be it noted: when viewing a working apparatus arranged in its operating position on the drive configuration, the longitudinal end, pointing away from the drive axial longitudinal end, of the actuator member is located, in the extended position, farther away from the drive axial end of the working apparatus than when the actuator member is in the retracted position.

The actuator can, however, be used not only to move the working apparatus from the preparation position closer to the operating position. It can also be used to move the working apparatus axially out of the operating position upon deinstallation. Provision can be made for that purpose that a release configuration of the actuator member is conveyable by axial movement of the actuator member into release force-transferring engagement with a counterpart release configuration of the working apparatus, the working apparatus being displaceable by the actuator out of the operating position upon establishment of the release force-transferring engagement. The release configuration can be connected in one piece with the actuator member or can be installed on it permanently, i.e. beyond the duration of a deinstallation operation. The release configuration can likewise be releasably mountable on the actuator member only for the individual deinstallation operation and removable again, although this is not preferred because of the often difficult accessibility of the actuator member prior to deinstallation of the working apparatus.

The release configuration can be embodied as a radial projection with respect to the movement axis of the actuator member.

The actuator is therefore preferably embodied to move the working apparatus relative to the drive configuration both toward the operating position, preferably into the operating position, and in the opposite direction out of the operating position. The actuator is therefore preferably a double-acting actuator that can exert force on the working apparatus in opposite directions.

A single-acting actuator, whose actuator member is preloaded for movement in a preload direction and is displaceable by the actuator against the action of the preload only in a working direction opposite to the preload direction, is nevertheless also expressly not to be excluded.

The working direction is then preferably a direction proceeding from the preparation position into the operating position, i.e. a direction proceeding from the extended to the retracted position of the actuator member. Beyond the context of installation operations, i.e. with the working apparatus in the operational state, the actuator member can abut as a result of the preload, for example the preload with a spring arrangement of the actuator, against a closure that closes off the actuator passthrough opening and/or a recess furnished on the drive configuration, in particular on its cover, for passage by the actuator member. The closure can be a retaining bolt that axially retains the working apparatus in its operating position on the drive configuration.

Be it noted merely for the sake of clarity that the axial movement of the actuator member in order to establish the release force-transferring engagement is preferably a movement of the actuator member in a direction from the retracted position toward the extended position. The movement of the actuator member for displacing the working apparatus from the preparation position toward the operating position, on the other hand, is a movement in a direction from the extended position toward the retracted position.

In principle, the counterpart release configuration can be permanently embodied or arranged on the working apparatus. In order to allow the actuator to be used without difficulty both for installing the working apparatus and for deinstalling it, however, it is preferred that the counterpart release configuration be embodied on a counterpart release component that is removably connectable to the working apparatus with no degradation of the operational readiness of the working apparatus due to removal of the counterpart release component.

In order to minimize the number of components for implementing the present invention, it is preferred if the aforementioned coupling structure that serves for indirect establishment of an installation force-transferring engagement between the actuator member and the working apparatus is embodied on the counterpart release component. The counterpart release component can then be used both for installation and for deinstallation. For example, the counterpart release component can have a recess having an internal thread that can be screwed onto an external thread on the actuator member. Once the actuator member has been moved into the extended position in which it passes through the aforementioned actuator passthrough opening of the working apparatus, the coupling structure of the counterpart release component can be bolted onto the actuator member (any other positively engaging connection, for example a bayonet closure, also being usable alternatively to a thread) so that upon retraction of the actuator member back toward the retracted position, the counterpart release component abuts with its component portion forming the coupling structure against the edge of the actuator passthrough opening, and the actuator member thus also moves the working apparatus in the context of its axial movement back toward the retracted position.

For example, the counterpart release component can be insertable into an opening of the working apparatus and fastenable in that opening, for example once again by being bolted in or by use of a bayonet closure or generally a positively engaging connection, so that the counterpart release configuration closes off the opening of the working apparatus. That opening is preferably the actuator passthrough opening already recited above. A longitudinal end, or at least a longitudinal end region, of the actuator member which is at the front upon a movement from the retracted into the extended position can thus be the release configuration of the actuator member which comes into abutment against the counterpart release configuration of the counterpart release component. The coupling structure and the counterpart release configuration can be embodied at different axial end regions of the counterpart release component.

The installation force-transferring engagement and/or the release force-transferring engagement can be, in simple but very effective fashion, an abutting engagement. Preferably the installation force-transferring engagement exists only for the duration of an installation operation, and/or the release force-transferring engagement exists only for the duration of a deinstallation operation. During earth working by the working apparatus as intended, the actuator member is preferably free of external engagements on its portion located outside the actuator housing. The actuator therefore remains minimally loaded, or in fact unloaded, during operation of the earth working machine as intended.

According to the inventive concept, it is sufficient in principle if the actuator is provided in some manner on the drive configuration. In the interest of a maximally symmetrical force application, the actuator or at least its actuator member is preferably provided on the drive configuration centrally with reference to the drive axis. The actuator member is preferably a member extending along a longitudinal axis, the longitudinal axis of the actuator member preferably being coaxial with the drive axis.

The drive configuration can, however, furthermore serve to protect the actuator from external influences. This is useful above all in the context of the preferred utilization of the working apparatus for removing material from the ground, since the working apparatus, and also portions of the drive configuration, are usually exposed to a considerable dirt impact in the case of material-removing earth working. In order to protect the actuator, and for efficient utilization of installation space, it is therefore preferred for the drive configuration to be a body, hollow at least in portions, in which the actuator is received.

Consideration is to be given to the fact that the actuator provided on the drive configuration as a rule co-rotates with the drive configuration during operation. This is not unproblematic in terms of supplying the actuator with drive energy for actuator actuation.

When the actuator is an electromechanical actuator that converts electrical current, constituting input energy, into mechanical movement energy of the actuator member, the actuator co-rotating with the drive configuration can be powered using slip rings on the drive configuration. The slip rings are preferably electrically insulated with respect to the remainder of the drive configuration, since the remainder of the drive configuration is usable as ground potential.

But because the actuator can be used for installation, and particularly preferably also for deinstallation, of the working apparatus in particular when the drive configuration is stationary, i.e. not rotating, energy can very generally be supplied to the actuator through a wall of the drive configuration, by the fact that a body portion of the drive configuration is penetrated by an energy passthrough opening at which or through which an energy connector line, which is connected to the actuator for the transfer of drive energy, is accessible.

In the interest of easier accessibility, the energy passthrough opening is preferably embodied in the region of a longitudinal end of the drive configuration, for example respectively in the last 30% of the length extent of the drive configuration, particularly preferably at a longitudinal end. Because the introduction longitudinal end of the drive configuration can be occupied by the aforementioned speed-stepdown transmission, the energy passthrough opening is preferably provided in the region of the functional longitudinal end. At least a portion of the energy passthrough opening is therefore preferably embodied in the cover. In order to simplify provision of the energy passthrough opening in terms of production engineering, the entire energy passthrough opening is preferably embodied in the cover.

Provision of the energy passthrough opening in the region of the introduction longitudinal end is not, however, to be excluded. For example, the shaft that introduces torque into the speed-stepdown transmission can be embodied as a hollow shaft, so that the opening of the hollow shaft can be the energy passthrough opening.

The working apparatus also preferably comprises an opening, corresponding to the energy passthrough opening, through which the energy connector line itself is accessible when the working apparatus is almost or entirely in its operating position.

The drive configuration, constituting body hollow at least in portions, is preferably embodied in tubular fashion at least over an axial portion, for example as a solid of revolution, in order to avoid undesired imbalances. "Tubular" here does not mean strictly cylindrical, but instead also encompasses conical, or generally tapering or flaring, tube conformations. The solid of revolution can then be the aforementioned tubular body.

To allow the maximum possible drive torque to be transferred from the drive configuration to the working apparatus, the drive configuration comprises a drive torque-transferring positively engaging coupling arrangement for drive torque-transferring positively engaging coupling to a counterpart coupling arrangement of the working apparatus.

In order to make proper establishment of the drive torque-transferring positively engaging coupling between the drive configuration and working apparatus easier for the personnel installing the working apparatus on the drive configuration, and to make checking of that coupling simple and efficient, the positively engaging coupling arrangement is preferably provided in the region of one of its longitudinal ends, for example in the region of the last 30% of the longitudinal extent of the drive configuration. Particularly preferably, the positively engaging coupling arrangement is located in the region of its functional longitudinal end located farther away from a site where drive torque is introduced into the drive configuration, since at the functional longitudinal end a positively engaging coupling between the drive configuration and working apparatus is not impeded by torque introduction components, for example the speed-stepdown transmission recited above. Highly preferably, the positively engaging coupling arrangement is located at the functional longitudinal end itself, for example on the cover, since it can be arranged on the machine body for easy access by an operator.

Since there already exists, with the positively engaging coupling arrangement, the possibility of embodying it as a projection on the drive configuration which engages or projects into a recess on the working apparatus, it is advantageous to embody the energy passthrough opening in the positively engaging coupling arrangement, since if the counterpart coupling arrangement is embodied as a passthrough opening on the working apparatus, access to the energy connector line is then ensured even when positively engaging coupling has been established. For example, the energy passthrough opening can be embodied in a positively engaging coupling projection of the positively engaging coupling arrangement, preferably passing through it in its longitudinal projection direction.

To allow the maximum possible torque to be transferred with the positively engaging coupling arrangement of the drive configuration and with the corresponding counterpart coupling arrangement of the working apparatus, it is preferably arranged at an axial distance from the drive axis.

The eccentric arrangement of the positively engaging coupling arrangement on the drive configuration furthermore allows space to remain on the drive configuration, in the region of the drive axis, for arranging a centering configuration that centers the working apparatus, relative to the drive configuration and thus relative to the drive axis, while it is being displaced toward the operating position. According to an advantageous refinement of the present invention provision is therefore made that the drive configuration comprises in the region of its functional longitudinal end, in particular at its functional longitudinal end, particularly preferably on the cover, a centering configuration that is embodied for positive centering engagement with a counterpart centering configuration rigidly connected to the working apparatus.

For simple and reliable centered arrangement of the working apparatus on the drive configuration, provision can furthermore be made that the drive configuration comprises, in a region located closer to its introduction longitudinal end than to its functional longitudinal end, a support cone which widens away from the functional longitudinal end and on which the working apparatus is braced, in its operating position, via a counterpart support cone. The support cone centers that end region of the working apparatus which is closer to the drive axial end on the drive configuration with respect to the drive axis.

The support cone can widen in steps and/or convexly and/or in linear radial fashion. Because of the increased inaccessibility of the bracing point, to facilitate installation and deinstallation of the working apparatus the counterpart support cone of the working apparatus merely abuts against the support cone. Positively engaging transfer of torque between the support cone and counterpart support cone therefore preferably does not occur.

The energy passthrough opening can be embodied in the centering configuration. Alternatively or additionally, the centering configuration can be capable of having the actuator member pass through it, and can comprise a corresponding passthrough opening. When passthrough openings are embodied simultaneously for energy and for the actuator member, the one for the actuator member is preferably embodied coaxially with the drive axis, while the energy passthrough opening can be embodied at a radial distance from the drive axis. This makes possible maximally centered, and thus uniform, force engagement by the actuator member with the working apparatus. Concentricity is immaterial, or not as important, for the transfer of energy through the energy passthrough opening.

An energy source that delivers energy during operation, as a result of the rotation of the drive configuration, to the actuator when the latter is externally inaccessible can be provided inside the drive configuration. Although the energy source can be any energy source, it is preferably a hydraulic energy source, since hydraulic actuators are preferred as actuators because of their high space-specific energy yield.

For example, the rotating drive configuration can drive a pump, received in it, that can be held on a component that does not co-rotate with the drive configuration or that co-rotates at a relative rotational speed. The pump can itself be the energy source and can supply hydraulic fluid directly to the actuator, or the pump can feed a hydraulic pressure accumulator that is in communication with the actuator. The pump and/or the energy accumulator can be protected by an interposed torque-dependent coupling from excessive load. An actuator can thus, if necessary, continuously exert force even if a supply line is not connected to its energy connector line. Preferably the actuator is actuatable, for the purpose of controlled displacement of the actuator member relative to the actuator housing, only if the energy connector line is connected to the supply line for transferring energy. The actuator can then be controlled by controlling energy transfer via the supply line. Preferably the actuator, on or preferably in the drive configuration, has no control apparatus that actively controls it, and is connected to a control apparatus actively controlling it only when the energy connector line is connected to the supply line in order to transfer energy.

The centering configuration of the drive configuration can be, for example, a centering stem that tapers in a direction away from the drive configuration, in particular in a direction away from its introduction end. At least one coupling configuration, for coupling an energy-carrying line to the energy connector line, can be provided on the centering configuration. The counterpart centering configuration can then preferably be a centering recess.

In this case all that is necessary, in order to furnish a continuous energy-transferring line to the actuator, is to bring energy-carrying lines from outside to the connecting configuration and connect them to it.

For simplified coupling of the energy connector line in the drive configuration to an energy-carrying supply line, provision can nevertheless very generally be made, regardless of the embodiment of an energy passthrough opening in the centering configuration, that the energy connector line comprises, at its end located remotely from the actuator, a coupling configuration that is embodied for energy-transferring coupling to a counterpart coupling configuration of a supply line.

Although the supply line can be any external supply line, the supply line is preferably likewise a line of the earth working machine that, however, is routed outside the drive configuration and leads away from an energy reservoir of the earth working machine, to which reservoir the energy connector line of the actuator in the drive configuration is connectable. In principle, the coupling configuration of the connector line can be rigidly connected to the drive configuration. To simplify establishment of the energy-transferring coupling between the coupling configuration and the counterpart coupling configuration, however, provision can also be made that an end, located remotely from the actuator, of the energy connector line is pullable, preferably pullable against a returning preload, out of the drive configuration through the energy passthrough opening in a direction away from the actuator.

The aforesaid energy reservoir can be an energy source and/or an energy accumulator. In the preferred case of a hydraulic pressure reservoir constituting the energy reservoir, it can be a hydraulic pump, a hydraulic pressure accumulator, or a circulation line working at a predetermined hydraulic pressure.

It must be added that the central arrangement of the actuator, presented above as preferred, is not the only possible arrangement of an actuator. The actuator can instead also be in several parts and can encompass several, preferably identical, sub-actuators each of which comprises a sub-actuator member. These sub-actuators can be arranged at a radial distance from the drive axis symmetrically, for example with identical angular spacings, around the drive axis in order to furnish, with minimal tilting torque, a force transfer from the actuator members to the working apparatus. The actuator constituted from several sub-actuators can also be capable of being supplied with energy in the manner described above via connector lines, through at least one energy passthrough opening in the drive configuration. A single energy supply line can branch to the individual sub-actuators in the interior of the drive configuration.

Regardless of the embodiment of the actuator as a single actuator or as a plurality of sub-actuators, in the preferred case of a hydraulic actuator the drive configuration preferably comprises two energy passthrough openings, one for each working direction of a double-acting cylinder. The energy connector lines of a plurality of sub-actuators firstly form one common line proceeding from the coupling configuration, and then branch to the individual sub-actuators.

As has already been stated above, the actuator can be an electromechanical actuator, for example in the form of a spindle drive or screw drive operated by an electric motor. The actuator can also be a fluid-mechanical actuator, hydraulic actuators being preferred as fluid-mechanical actuators because of better space-specific energy provision. The actuator is preferably a piston/cylinder arrangement, particularly preferably a double-acting piston/cylinder arrangement. The actuator member is then a piston rod. When several sub-actuators are used it is also possible to use a mixed embodiment of sub-actuators, some of which are fluid-mechanical sub-actuators and some others of which are electromechanical actuators.

An energy compensation reservoir or buffer reservoir can be provided in the drive configuration, in particular in the form of a hydraulic compensation reservoir or buffer reservoir, so that pressure differences induced by temperature differences in the hydraulic fluid of, in particular, the double-acting hydraulic piston/cylinder units that are preferably used as fluid-mechanical actuators can be mitigated or equalized. Such temperature differences can be caused meteorologically or by energy dissipated in the context of earth working.

For particularly simple and quick, but effective, positional retention of the working apparatus in the operating position, provision can be made that the working apparatus is retainable axially in its operating position on the drive configuration by way of a central bolt arrangement, in particular a central bolt, having a bolt axis coaxial with the drive axis.

When the working apparatus is in the operating position, the central bolt arrangement can be capable of being bolted into the actuator member or into the drive configuration, for example into the centering configuration therein. The centering configuration, constituting a centering stem, offers a sufficient thread engagement length for the bolt arrangement. Unnecessary weakening of the drive configuration with too many openings or recesses is thereby avoided.

In principle, the drive axis can be oriented arbitrarily on the machine body; preferably it is oriented parallel to the contact substrate so that a homogeneous working engagement of the working apparatus with the ground can be brought about over the axial extent of the working apparatus. The drive axis is preferably oriented in a transverse machine direction of the working machine, so that the working apparatus can be advanced relative to the ground orthogonally to the drive axis by a travel drive of the earth working machine.

The working apparatus is preferably a milling drum or milling rotor encompassing a milling drum tube which radially internally hollow at least in portions and on whose radially outward-facing side material-removing tools, such as milling bits and, for simplified replacement thereof, bit holders and/or quick-change bit holders can be arranged in a manner known per se. The working apparatus can be capable of being lowered toward the contact substrate and raised away from it, relative to the machine body or together with the machine frame carrying the machine body.

BRIEF DESCRIPTION OF THE DRAWINGS

The present invention will be explained in further detail below with reference to the appended drawings, in which.

DETAILED DESCRIPTION

Figure 1:
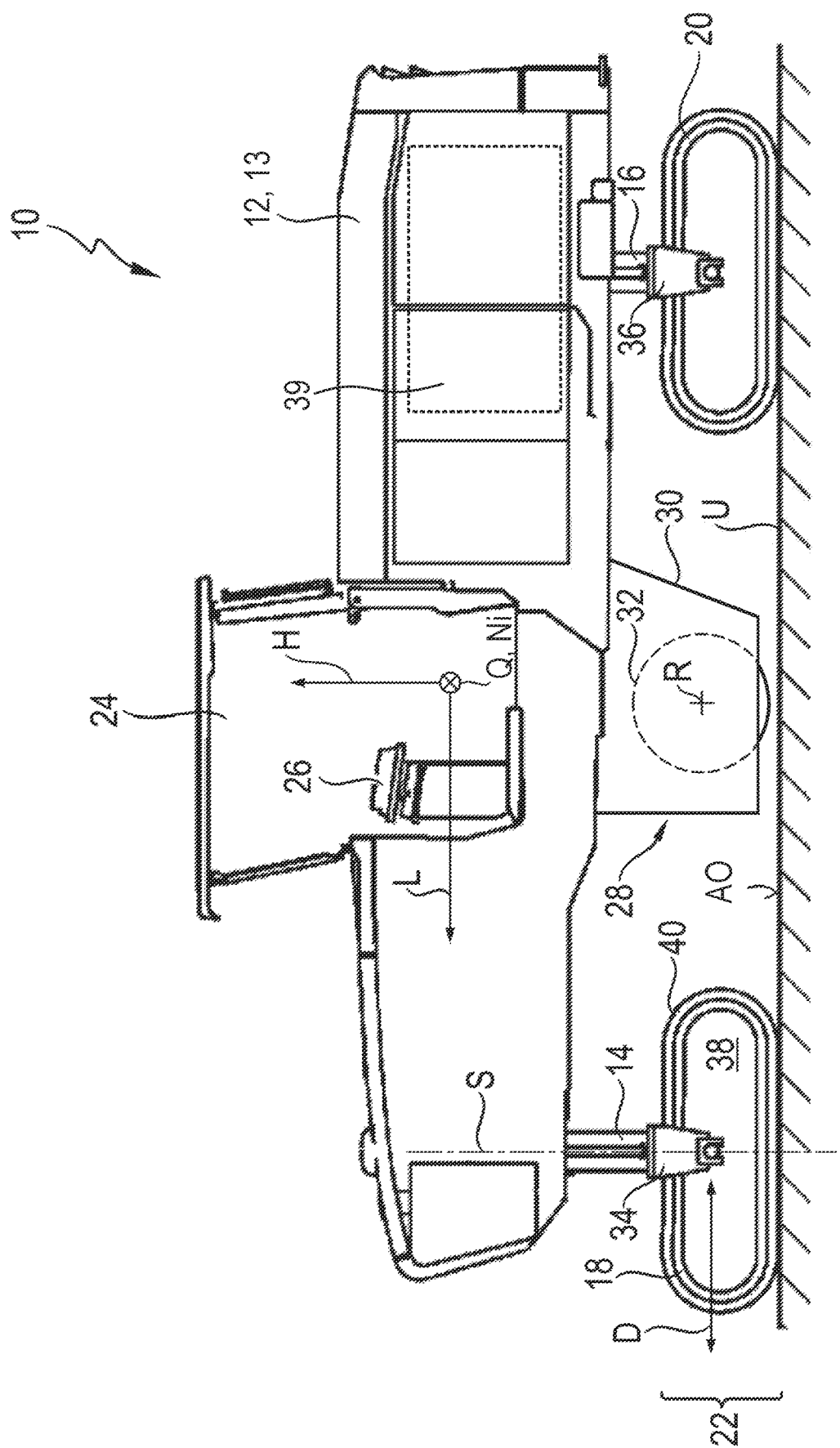
FIG. 1 is a schematic side view of an embodiment according to the present invention of an earth working machine in the form of a large milling machine, in a position for rolling travel operation.

In FIG. 1, an embodiment according to the present invention of an earth working machine in the form of a ground milling or road milling machine is labeled 10 in general. It encompasses a machine frame 12 that constitutes the basic framework for a machine body 13. Machine body 13 encompasses machine frame 12 and the components of machine 10 which are connected to the machine frame and are optionally movable relative thereto.

Machine body 13 encompasses front lifting columns 14 and rear lifting columns 16, which are connected at one end to machine frame 12 and at the other end respectively to front drive units 18 and to rear drive units 20. The distance of machine frame 12 from drive units 18 and 20 is modifiable by way of lifting columns 14 and 16.

Drive units 18 and 20 are depicted by way of example as crawler track units. In a departure therefrom, individual, or all, drive units 18 and/or 20 can also be wheel drive units.

The viewer of FIG. 1 is looking toward the drive side of earth working machine (or simply "machine") 10 in transverse machine direction Q that is orthogonal to the drawing plane of FIG. 1. A longitudinal machine direction orthogonal to transverse machine direction Q is labeled L and extends parallel to the drawing plane of FIG. 1. A vertical machine direction H likewise extends parallel to the drawing plane of FIG. 1 and orthogonally to longitudinal and transverse machine directions L and Q. The arrowhead of longitudinal machine direction L in FIG. 1 points in a forward direction. Vertical machine direction H extends parallel to the yaw axis of machine 10, longitudinal machine direction L extends parallel to the roll axis, and transverse machine direction Q extends parallel to pitch axis Ni. The idle side of machine 10 faces away from the viewer of FIG. 1.

Earth working machine 10 can comprise an operator's platform 24 from which a machine operator can control machine 10 via a control panel 26.

Arranged below machine frame 12 is a working assembly 28, here constituting, for example, a milling assembly 28 having a milling drum 32, received in a milling drum housing 30, that is rotatable around a milling axis R extending in transverse machine direction Q so that substrate material can be removed therewith, as an earth working operation, starting from contact surface AO of substrate U to a milling depth determined by the relative vertical position of machine frame 12. Milling drum 32 is therefore a working apparatus within the meaning of the present Application.

The vertical adjustability of machine frame 12 by way of lifting columns 14 and 16 also serves to set the milling depth, or generally working depth, of machine 10 in the context of earth working. Earth working machine 10 depicted by way of example is a large milling machine, for which the placement of milling device 28 between the front and rear drive units 18 and 20 in longitudinal machine direction L is typical. Large milling machines of this kind, or indeed earth-removing machines in general, usually comprise a transport belt so that removed earth material can be transported away from machine 10. In the interest of better clarity, a transport belt that is also present in principle in the case of machine 10 is not depicted in FIG. 1.

It is not apparent from the side view of FIG. 1 that machine 10 comprises, in both its front end region and its rear end region, two respective lifting columns 14 and 16 each having a drive unit 18, 20 connected to it. Front lifting columns 14 are respectively connected to drive units 18, in a manner also known per se, by means of a drive unit connecting structure 34, for example a connecting fork fitting around drive unit 18 in transverse machine direction Q. Rear lifting columns 16 are connected to their respective drive unit 20 via a drive unit connecting structure 36 constructed identically to drive unit connecting structure 34. Drive units 18 and 20 are of substantially identical construction, and constitute propelling unit 22 of the machine. Drive units 18 and 20 are motor-driven, as a rule by a hydraulic motor (not depicted).

The drive energy source of machine 10 is constituted by an internal combustion engine 39 received on machine frame 12. In the exemplifying embodiment depicted, milling drum 32 is rotationally driven by it. The output of internal combustion engine 39 furthermore makes available on machine 10 a hydraulic pressure reservoir by means of which hydraulic motors and hydraulic actuators on the machine can be operated. Internal combustion engine 39 is thus also a source of the propulsive power of machine 10.

In the example depicted, drive unit 18, having a travel direction indicated by double arrow D, comprises a radially internal receiving and guidance structure 38 on which a circulating drive track 40 is arranged and is guided for circulating movement.

Drive unit 18 is rotatable around a steering axis S by means of a steering apparatus (not further depicted). Preferably additionally, but also alternatively, lifting column 16, and with it drive unit 20, can be rotatable by means of a steering apparatus around a steering axis parallel to steering axis S.

Figure 2:
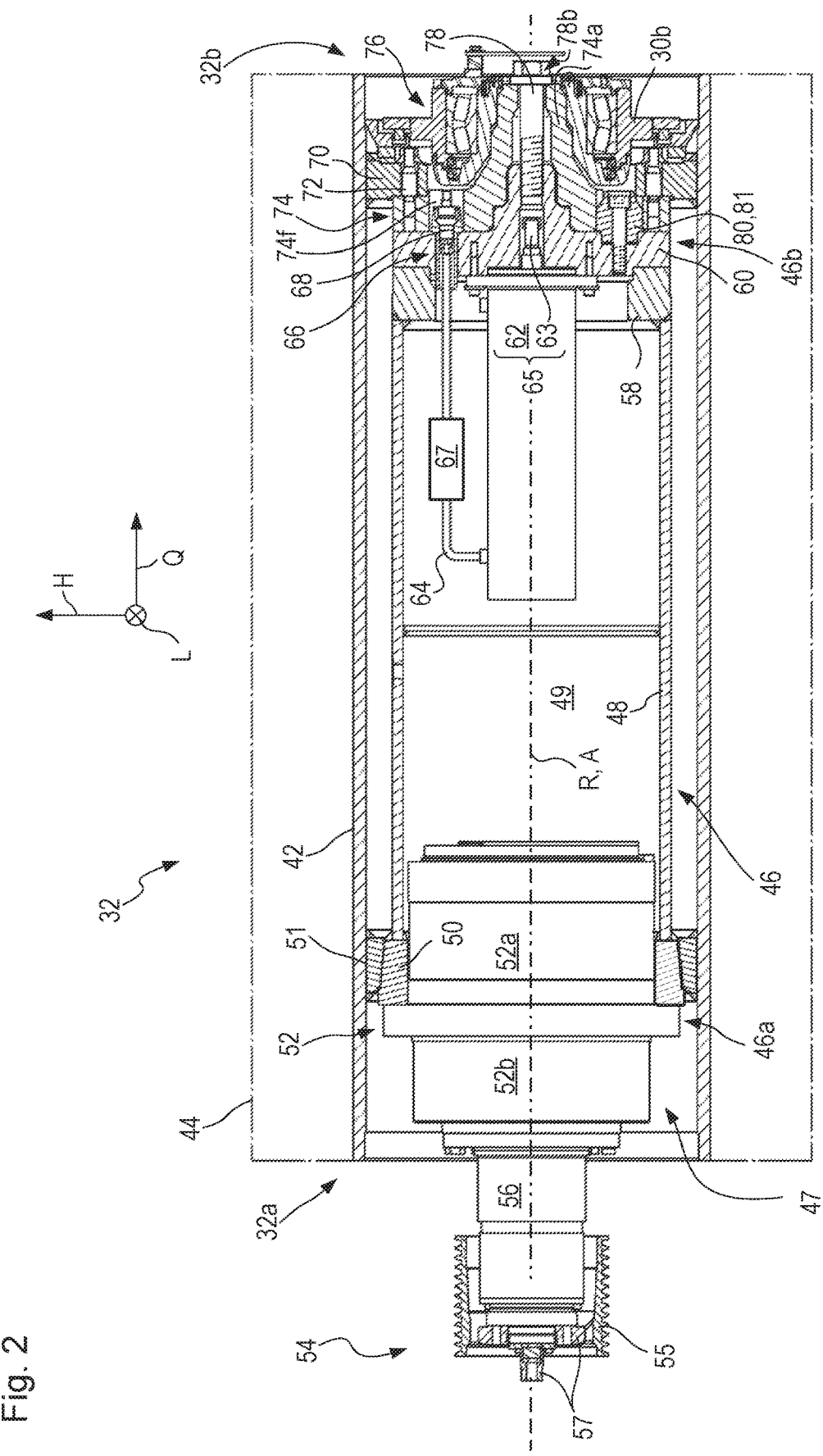
FIG. 2 is a schematic longitudinal section view through the working apparatus of the earth working machine of FIG. 1 in an operational state for earth working, in which the section plane contains the rotation axis of the working apparatus.

FIG. 2 is a schematic longitudinal section view of milling drum 32 of FIG. 1 in a section plane containing rotation axis R of the milling drum.

Milling drum 32 encompasses a substantially cylindrical milling drum tube 42 on whose radially outer side bit holders or quick-change bit holders, having milling bits in turn received replaceably therein, are provided in a manner known per se. A dot-dash line 44 indicates the effective diameter (cutting cylinder) of milling drum 32, defined by the milling bit tips of the milling bits (not depicted). Milling drum 32 is in an operational condition ready for earth-removing work. Milling drum 32 is connected for that purpose in torque-transferring fashion to a drive configuration 46. Milling drum 32 radially externally surrounds drive configuration 46.

A planetary gearset that steps speed down and steps torque up is received in a transmission housing 52. A right (in FIG. 2) part 52a of transmission housing 52 is coupled to the ring gear of the planetary gearset for rotation together. A left (in FIG. 2) part 52b of transmission housing 52 is a machine frame-mounted part of machine body 13.

Drive configuration 46 encompasses an internal tube 48, a support cone 50, and part 52a, rotatable relative to machine frame 12, of transmission housing 52. Support cone 50 and internal tube 48 are connected to one another, and are connected as an assembly to transmission housing part 52a for rotation together around drive axis A of drive configuration 46. With milling drum 32 in the operational state, drive axis A of drive configuration 46 and rotation axis R of milling drum 32 are coaxial.

Milling drum tube 42 is braced against support cone 50 of drive configuration 46 by a negatively conical counterpart support cone 51.

Drive configuration 46 is furthermore connected to a drive torque-transferring arrangement 54 that, in the example depicted, encompasses inter alia a belt pulley 55. Belt pulley 55 is connected to an input shaft (not depicted in FIG. 2) of the planetary gearset in transmission housing 52. The input shaft, connected to belt pulley 55 for rotation together, extends through a shaft tunnel 56 that is machine frame-mounted in the exemplifying embodiment depicted and is rigidly connected to transmission housing part 52b.

A rotational drive embodied separately from drive motor 39 of drive apparatus 46 can be coupled to drive configuration 46 via a coupling configuration 57 in order to transfer drive torque. Be it noted merely for the sake of completeness that coupling configuration 57 can be provided at any point on drive torque-transferring arrangement 54, as long as the drive configuration can be caused to rotate around drive axis A by actuation of coupling configuration 57. The rotational drive (not depicted) that can be coupled onto coupling configuration 57 can also be a manual rotational drive.

Drive configuration 46 forms, with the machine frame-mounted assembly made up of transmission housing part 52b and shaft tunnel 56, a drive assembly 47 that projects axially into milling drum 32 from a drive axial end 32a of milling drum 32. Milling drum 32 preferably protrudes axially on both sides beyond drive configuration 46 constituting that part of drive assembly 47 which is rotatable relative to machine frame 12.

Drive assembly 47, and with it drive configuration 46, is mounted on machine body 13 in the region of shaft tunnel 56. The mounting of drive configuration 46 in the region of the rotatable transmission housing part 52a constitutes a locating bearing of drive configuration 46. Axial longitudinal end 46a, located closer to belt pulley 55, of drive configuration 46 is also referred to in the present Application as the "introduction" longitudinal end 46a, since in the present exemplifying embodiment it is by way of this introduction longitudinal end 46a that drive torque is introduced into drive configuration 46.

Milling drum 32 extends axially, along its rotation axis (milling axis) R that coincides with drive axis A in the operational state, between drive axial end 32a located closer to drive torque-transferring arrangement 54 in FIG. 2 and a retention axial end 32b, located oppositely from the drive axial end, that is located closer to the axial positional retention point of milling drum 32 in the operational state.

At functional longitudinal end 46b located axially oppositely from introduction longitudinal end 46a, drive configuration 46 comprises a support ring 58 and an end-located cover 60 connected to support ring 58. In the exemplifying embodiment depicted, support ring 58 is connected to internal tube 48 by welding. Cover 60 can likewise be welded, or also bolted, onto support ring 58. It is connected to support ring 58 and to internal tube 48 for rotation together around drive axis A.

Support ring 58 can be embodied in a variety of ways. Its conformation is not of essential importance. In the depictions of the present Application it is shown in a slightly differing form in each case, but this has no influence at all on the present invention.

The same is true of the radially external regions of cover 60 which interact with support ring 58 to constitute a nonrotatable connection.

In the first exemplifying embodiment depicted in FIG. 2, a hydraulic cylinder 62, which is arranged with its hydraulic cylinder axis coaxial with drive axis A of drive configuration 46, is received in interior 49 of drive configuration 46 on cover 60. Hydraulic cylinder 62 can be supplied with hydraulic fluid by means of a hydraulic connector line, or in general an energy connector line, 64 through an energy passthrough opening 66 in cover 60. Hydraulic cylinder 62, and piston rod 63 hydraulically extendable from and retractable into hydraulic cylinder 62, constitute within the meaning of the introductory part of the description an actuator that is arranged on, and in the present preferred case in fact in, drive configuration 46. Piston rod 63 is, within the meaning of the introductory part of the description, an actuator member translationally movable relative to hydraulic cylinder 62 constituting an actuator housing. Its displacement travel relative to hydraulic cylinder 62 is at least 150 mm. In a preferred embodiment the displacement travel of piston rod 63 is at least 300 mm.

Hydraulic connector line 64 is connected at its one longitudinal end to hydraulic cylinder 62 and can project into or pass through energy passthrough opening 66, and at its other longitudinal end located remotely from hydraulic cylinder 62 can end in a coupling configuration 68. A further hydraulic connector line, which is labeled as hydraulic connector line 64' in FIG. 6 and is explained below, is also present in the embodiment of FIG. 2 but is not depicted. With the exception of its connection point on hydraulic cylinder 62 it is identical in construction to line 64, and likewise ends in a coupling configuration. In order to supply hydraulic cylinder 62, coupling configuration 68 and the further coupling configuration are each connectable to a counterpart coupling configuration of another of two supply lines that are present but are not depicted in FIG. 2, so that piston rod 63 can be extended from hydraulic cylinder 62 and retracted back into it (see e.g. supply lines 69 and 169 in FIGS. 5, 6, 9, and 10). Actuator 65 is thus ready to operate only if the hydraulic cylinder is connected to, and can be supplied through, a hydraulic pressure reservoir furnishing hydraulic pressure, for example a hydraulic pump, a hydraulic pressure accumulator, or a circulation line having a predetermined hydraulic pressure level.

The hydraulic lines are connected to equalization reservoirs in order to equalize pressure changes, induced by temperature fluctuations, in the hydraulic fluid of hydraulic cylinder 62 and of its hydraulic connector lines. A compensating reservoir or buffer reservoir 67 is depicted (only in FIG. 2) by way of example on hydraulic connector line 64.

Once axial positional retention, as shown in FIG. 2, of milling drum 32 on drive configuration 46 has been released, milling drum 32 can be axially pushed away from drive configuration 46 for deinstallation using piston rod 63, and/or pulled onto drive configuration 46 for installation, as will be explained later on in more detail in conjunction with FIGS. 4 to 6.

A connecting ring 70 is arranged radially internally on milling drum tube 42 in a region located closer to retention axial end 32b, and is connected, by way of a welded join in the example depicted, to milling drum tube 42 for rotation together.

Milling drum tube 42 is rigidly connected to a connecting flange 74 via a connecting ring 70 by means of threaded studs 72.

Provided on connecting flange 74, preferably in one piece therewith, is a bearing stem 74a that protrudes axially toward retention axial end 32b from a connecting region of connecting flange 74 with connecting tube 70.

With milling drum 32 in the operational state, a non-locating bearing 76 that braces drive configuration 46 is arranged on bearing stem 74a. Non-locating bearing 76, arranged at an axial distance from the locating bearing, can be pulled off axially from bearing stem 74a.

With the milling drum (working apparatus) 32 in the operating position, and even before the operating position is reached, an opening 74f of connecting flange 74 is preferably located relative to energy passthrough opening 66, by preference in axial alignment with it, in such a way that coupling configuration 68 is also accessible through opening 74f in order to supply hydraulic cylinder 62 with hydraulic fluid.

Non-locating bearing 76 can be received, for example, in a side plate or side door 30a that is part of milling drum housing 30 and is end-located axially oppositely from milling drum 32 at retention axial end 32b. All that is shown in FIG. 2 is a component 30b, rigidly connected to such a side wall 30a, constituting a bearing surface for the outer bearing ring of non-locating bearing 76.

As will be explained in more detail with reference to the enlarged depiction in FIG. 3 of functional longitudinal end 46b of the drive configuration, milling drum 32 is retained in its axial position on drive configuration 46 only by a single central retaining bolt 78. Retaining bolt 78 constitutes an example of a bolt arrangement mentioned in the introductory part of the description.

Milling drum 32 is thus braced on drive configuration 46, coaxially with drive axis A, via counterpart support cone 51 and via connecting flange 74.

Embodied on cover 60, preferably in one piece therewith, is a centering configuration 60a in the form of a centering stem which protrudes from cover 60, in a direction away from introduction longitudinal end 46a of drive configuration 46, toward retention axial end 32b of milling drum 32. Centering stem 60a projects into a counterpart centering configuration 74b, embodied as a centering recess, on connecting flange 74, and thereby centers milling drum tube 42, connected rigidly to connecting flange 74, with respect to drive axis A. Connecting flange 74 is therefore a centering component. Cover 60 comprises a central recess 60b, passing axially through it, through which piston rod 63 in FIG. 2 and FIG. 3 can pass axially.

At the end region of centering stem 60a facing toward retention axial end 32b, recess 60b in centering stem 60a is equipped with an internal thread into which the central retaining bolt 78 is screwed.

Figure 3:
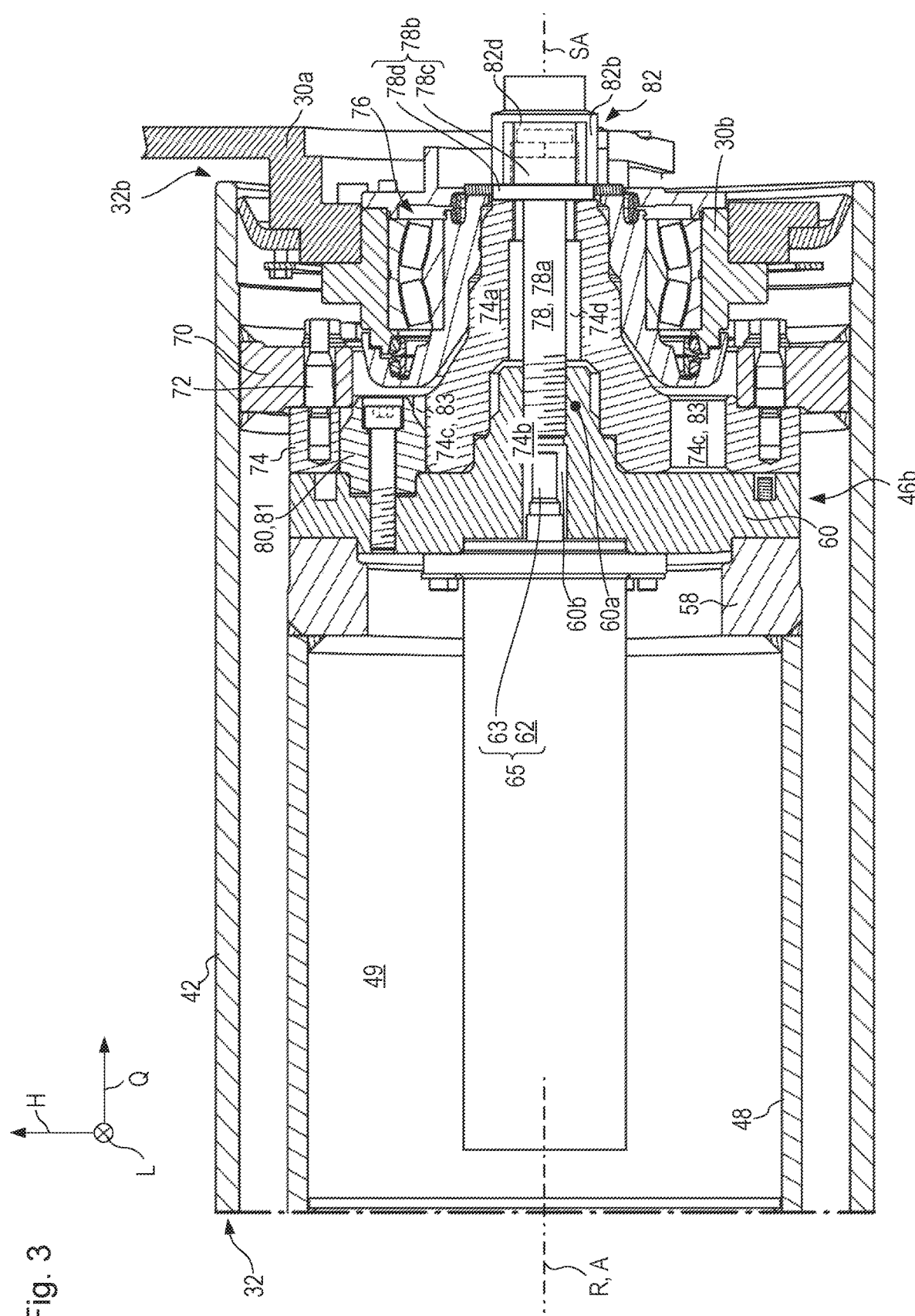
FIG. 3 is an enlarged depiction of the right end of the drive configuration and working apparatus shown in FIG. 2, set up for establishing and/or releasing axial positional retention of the working apparatus.

Although the bolt arrangement can also be embodied in several parts, for example by way of a threaded rod and a retaining nut optionally with a washer, rather than as a one-piece retaining bolt 78, the one-piece bolt arrangement in the form shown in FIG. 3 is preferred because of its simple and reliable handling and stowing capability. The central retaining bolt 78 encompasses a threaded shank 78a having an external thread, and a bolt head 78b projecting radially beyond threaded shank 78a and having a tool engagement configuration 78c known per se, for example in the form of a hex head polyhedron. Embodied between threaded shank 78a and tool engagement configuration 78c is an abutment portion 78d constituting an axial narrow but radially protruding cylinder. This abutment portion 78d is embodied in the present example in one piece with threaded shank 78a and tool engagement configuration 78c, but can also alternatively be provided as a separate washer.

Bolt head 78b thus clamps bearing stem 74a, and with it connecting flange 74 and with that in turn connecting ring 70 and milling drum tube 42, axially against support cone 50 of drive configuration 46.

When milling drum 32 is arranged axially at a distance from its operating position but still with a certain prepositioning in a preparation position, for example such that that longitudinal end of centering stem 60a which is located remotely from support ring 58 is already projecting into centering recess 74b of connecting flange 74, it is thus possible to move milling drum 32 with centering bolt 78 axially into its operating position. Care must simply be taken that pins 80 provided on cover 60 at a radial distance from drive axis A can travel into recesses 74c, provided for that purpose, of connecting flange 74, so as thereby to couple cover 60 to connecting flange 74 in order to transfer torque between drive configuration 46 and milling drum 32.

Pins 80, a plurality of which are preferably provided in a circumferential direction around drive axis A, constitute a positively engaging coupling arrangement 81 within the meaning of the introductory part of the description above. Particularly preferably, pins 80 are arranged equidistantly in a circumferential direction.

Recesses 74c, into which pins 80 project axially when milling drum 32 is in the operational state, constitute a counterpart coupling arrangement 83 within the meaning of the introductory part of the description above.

Threaded shank 78a of retention bolt 78 also passes through a shank conduit 74d that, proceeding from centering recess 74b, passes axially through centering stem 74a on connecting flange 74. Centering recess 74b and shank conduit 74d together form a continuous passage through connecting flange 74, through which piston rod 63 can pass completely when the latter is completely extended out of hydraulic cylinder 62. Centering recess 74b and shank conduit 74d together constitute an actuator passthrough opening within the meaning of the introductory part of the description.

Milling drum 32 can be slid into the operating position onto drive configuration 46, and pulled off it, in manual/mechanical fashion with the aid of retaining bolt 78 or a separate release component (not depicted in the present Application). Displacement of milling drum 32 from a preparation position toward the operating position, preferably into the operating position shown in FIGS. 2 and 3, is, however, made substantially easier by actuator 65, and as a rule requires no further mechanical intervention with the exception of retaining milling drum 32 in the operating position or releasing axial positional retention of the milling drum upon deinstallation.

FIG. 3 shows the view of FIG. 2 with a bolting moment bracing arrangement 82 placed onto bolt head 78b. Bolting moment bracing arrangement 82 is not sectioned.

Bolting moment bracing arrangement 82 serves to establish and release axial positional retention of milling drum 32 on drive configuration 46. Bolting moment bracing arrangement 82 extends along a component axis SA that is coaxial with drive axis A when bolting moment bracing arrangement 82 is placed onto retaining bolt 78.

Bolting moment bracing arrangement 82 is embodied as a fitover tool having an engagement region that is embodied, in the example depicted, as a recess having a shape complementary to tool engagement configuration 78c of retaining bolt 78, i.e. in this case as a hex socket polyhedron. Bolting moment bracing arrangement 82 can thus be placed axially, with its engagement region, onto bolt head 78b of retaining bolt 78. A torque can thus be transferred in positively engaging fashion between bolt 78 and bolting moment bracing arrangement 82.

The engagement region is provided on an engagement portion 82b of bolting moment bracing arrangement 82. Two projections, for example, protrude in diametrical opposition radially (with respect to component axis SA) from said engagement portion 82b. The only projection 82d of the two projections which is shown in FIG. 3 extends in FIG. 3, orthogonally to the drawing plane of FIG. 3, toward the viewer. The other projection is located behind the drawing plane in FIG. 3 and is concealed by engagement portion 82b. A counterpart bracing component interacting with bolting moment bracing arrangement 82 is not shown in FIG. 3 but is briefly described below.

With bolting moment bracing arrangement 82 in the state, shown in FIG. 3, of being placed onto the central retaining bolt 78, bolting moment bracing arrangement 82 is radially externally surrounded by a counterpart bracing component that is fixedly connected to side plate 30a of milling drum housing 30, for example by bolting.

The counterpart bracing component comprises a central recess through which head 78b of retaining bolt 78 is axially accessible externally, i.e. from outside machine body 13, in order to place bolting moment bracing arrangement 82 thereonto and pull it off therefrom.

After bolting moment bracing arrangement 82 is placed onto retaining bolt 78, a rotation of drive configuration 46 causes its radial projections to come into abutment against flanks, facing in a circumferential direction, of the recess of the counterpart bracing component. As a result of the positive engagement of the engagement region of bolting moment bracing arrangement 82 with bolt head 78b of retaining bolt 78, a drive torque introduced into drive configuration 46 on the locating-bearing side of drive configuration 46 is braced by positively engaging abutment between the projections and the counterpart bracing component on the non-locating-bearing side of drive configuration 46. This ensures that as rotational driving of drive configuration 46 continues, a relative rotation occurs between retaining bolt 78 and drive configuration 46, and a helical movement of retaining bolt 78 relative to drive configuration 46 (in the example depicted, relative to centering stem 60a) thus occurs. Retaining bolt 78 can thus, as a result of the bracing effect of bolting moment bracing arrangement 82 in interaction with the counterpart bracing component, be tightened or loosened with an extremely high torque.

Axial positional retention of milling drum 32 relative to drive configuration 46 can be established and released without tools with the exception of bolting moment bracing arrangement 82.

The first embodiment already explained in FIGS. 2 and 3 will be explained below in terms of operation thereof for deinstalling and installing milling drum 32 from and onto drive configuration 46 using actuator 65.

Figure 4:
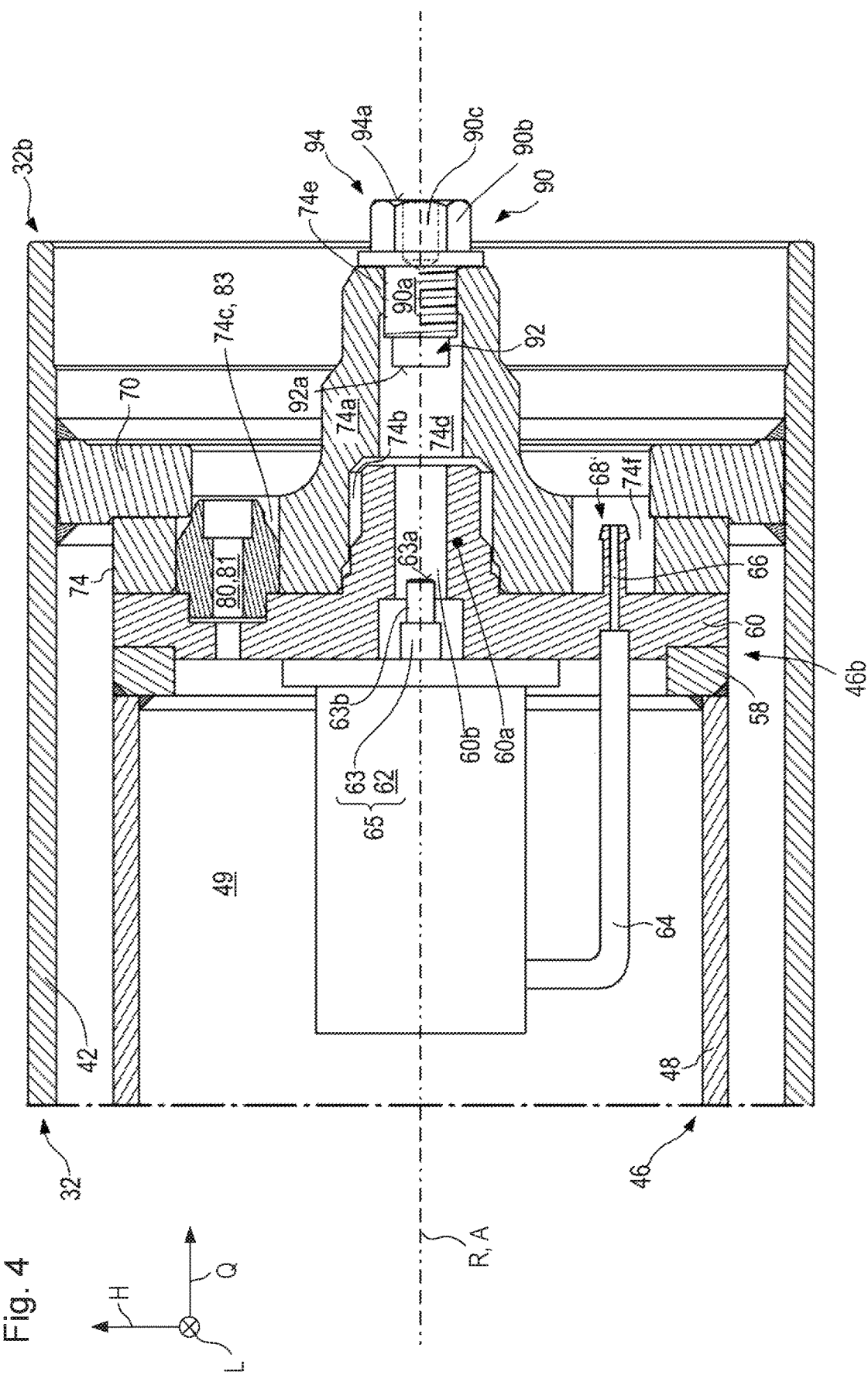
FIG. 4 is a depiction, corresponding to the view of FIG. 3, of a variant of the first embodiment of the drive configuration and working apparatus in accordance with FIGS. 2 and 3, set up for deinstallation of the working apparatus from the drive configuration.
Figure 5:
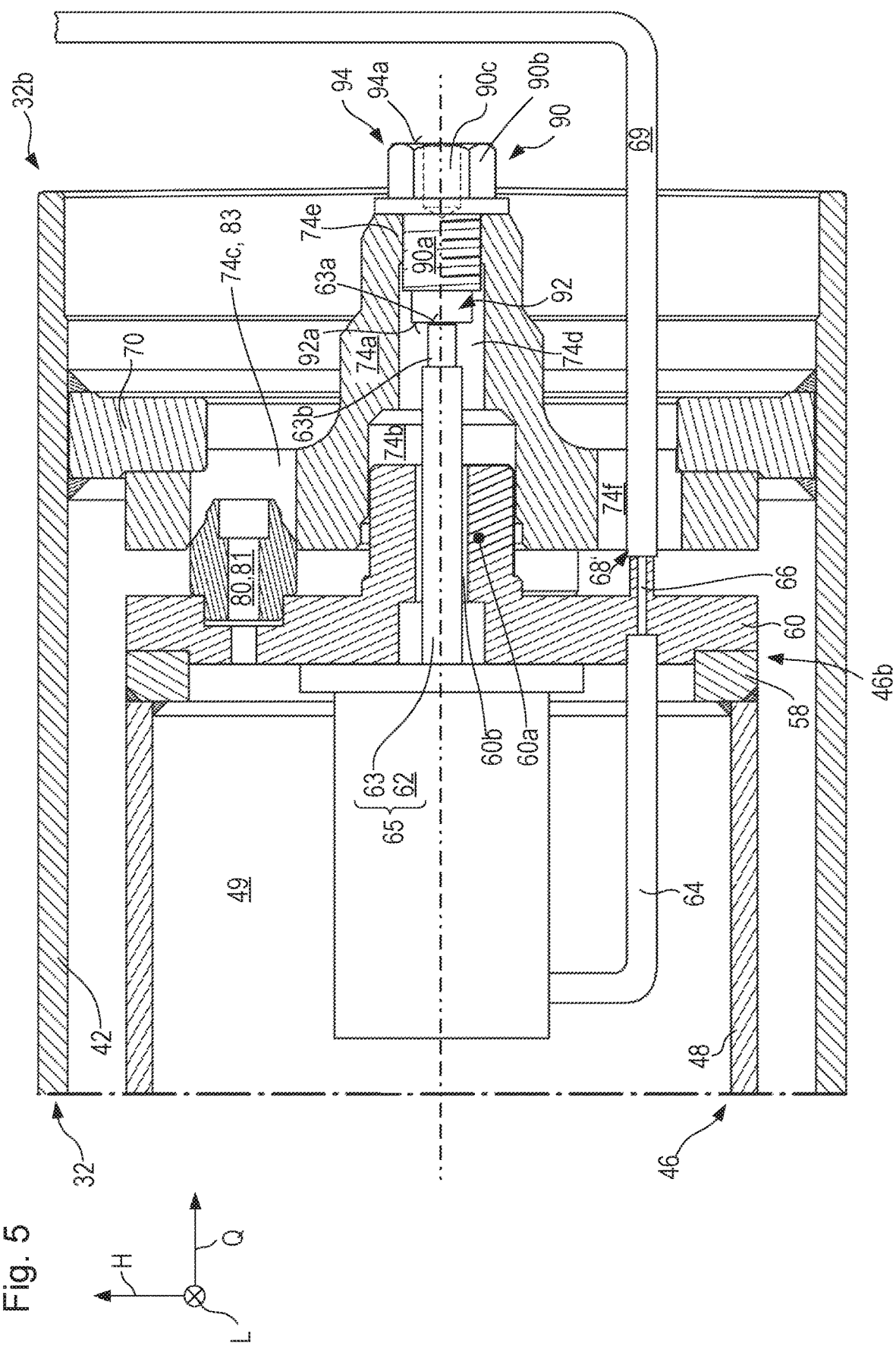
FIG. 5 shows the drive configuration and working apparatus of FIG. 4 during deinstallation of the working apparatus.
Figure 6:
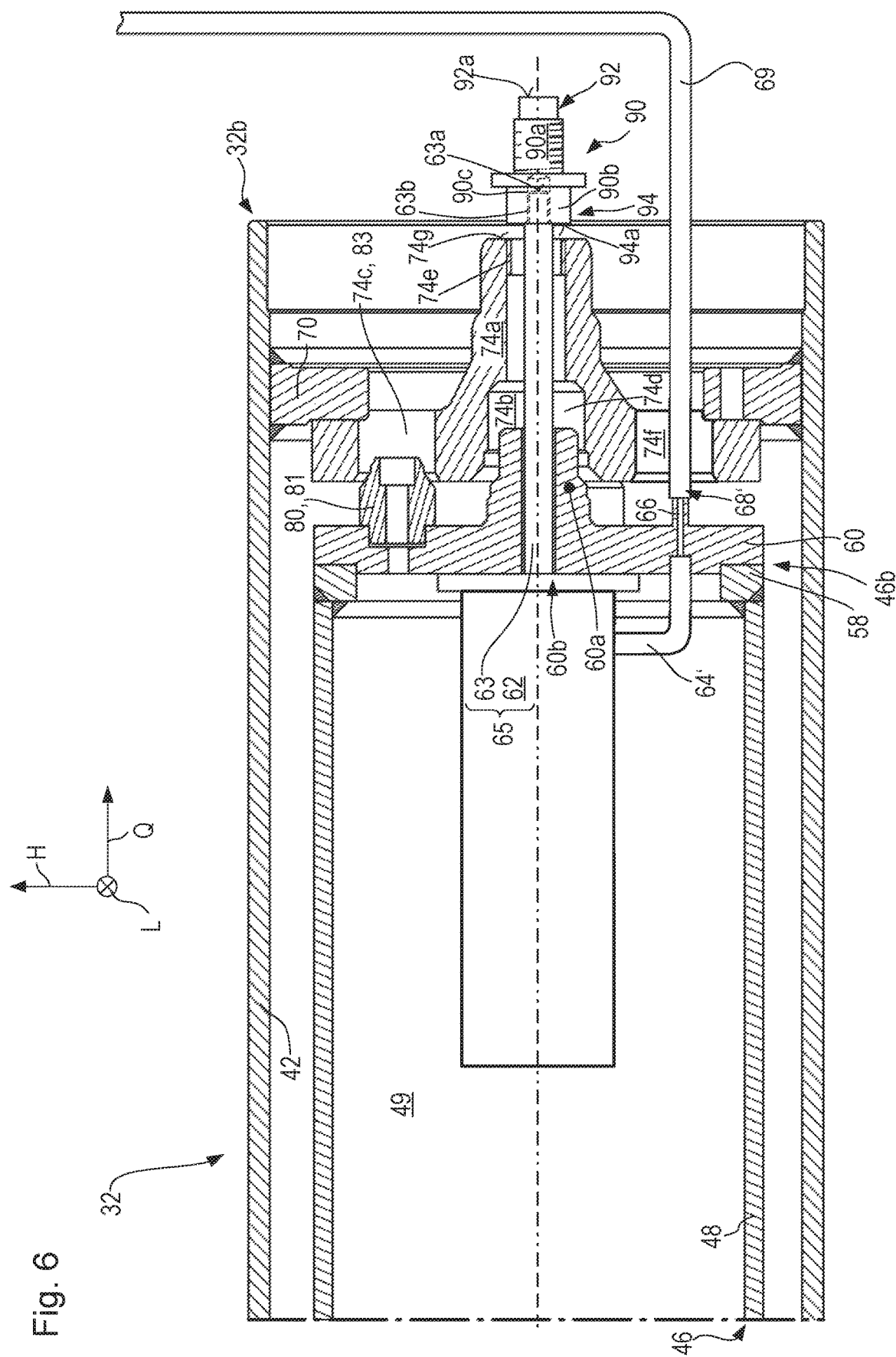
FIG. 6 shows the drive configuration and working apparatus of FIGS. 4 and 5, set up for installation of the working apparatus onto the drive configuration.

In the variant embodiment of FIGS. 4 to 6, coupling configuration 68' is embodied directly on cover 60. Energy connector line 64 passes through coupling configuration 68' so that hydraulic cylinder 62 can be supplied with hydraulic fluid.

The point at which energy connector line 64 connects to hydraulic cylinder 62 is selected merely by way of example. Be it noted that all the hydraulic cylinders depicted in the Figures are double-acting cylinders. Each of two hydraulic chambers, acting in opposite directions, of a hydraulic cylinder that is depicted is coupled to a respective energy connector line 64. For the sake of clarity, and because it is sufficient for a basic understanding of the embodiment, in many depictions only one of two energy connector lines 64, 64' is shown. An energy connector line 64 leads to the chamber that slides piston rod 63 out, and an energy connector line 64' leads to the chamber that retracts piston rod 63.

In an alternative embodiment, only a single hydraulic line can also be present, and the hydraulic cylinder is returned, for example, via spring tension.

In FIG. 4, a counterpart release component 90 is bolted into an internal thread 74e at that longitudinal end of bearing stem 74a which is located remotely from actuator 65.

Counterpart release component 90 has for that purpose a thread portion 90a, having an external thread, that (in FIG. 4) is in bolting engagement with internal thread 74e on bearing stem 74a.

In order for it to be bolted into bearing stem 74a connected rigidly to milling drum tube 42, counterpart release component 90 comprises a tool engagement configuration 90b, in the example depicted a hex head polyhedron.

In its operating state shown in FIG. 4 in which it is bolted into bearing stem 74a, counterpart release component 90 comprises, at its longitudinal end 92 facing toward drive configuration 46, a counterpart release configuration 92a in the form of a flat abutment surface. A likewise flat abutment surface at the free longitudinal end of piston rod 63 forms a release configuration 63a of actuator 65, which configuration can be brought, by extending piston rod 63 (shown in the retracted state in FIG. 4), into abutting engagement (release force-transferring engagement) with counterpart release configuration 92a. As a result of the exertion of compressive force by means of piston rod 63 on counterpart release component 90, the release force-transferring engagement then produced allows milling drum 32 to be shifted axially, to the right in FIG. 4, out of the operating position shown in FIG. 4.

Piston rod 63 further comprises, at its free longitudinal end, an external thread 63b with which piston rod 63 can be brought into bolting engagement with an internal thread 90c of counterpart release component 90. Internal thread 90c is accessible from longitudinal end 94, located oppositely from longitudinal end 92 carrying counterpart release configuration 92a, of counterpart release component 90, and extends axially into counterpart release component 90. The abutment surface, surrounding internal thread 90c at longitudinal end 94, of counterpart release component 90 forms a coupling structure 94a with which, when counterpart release component 90 is bolted onto external thread 63b of piston rod 63, milling drum 32 can be moved from a preparation position toward the operating position, preferably into the operating position.

FIG. 5 shows a state of working assembly 28 of FIG. 4 in which a release force-transferring engagement is established between release configuration 63a of piston rod 63 and counterpart release configuration 92a of counterpart release component 90. By means of the release force-transferring engagement that was established, milling drum 32 has been shifted by the force of actuator 65 out of the operating position into a position, located axially remotely therefrom, that can also be the preparation position for another displacement of milling drum 32 toward the operating position.

To allow actuator 65 to be operated, a hydraulic supply line 69 of machine 10 has been connected to energy connector line 64, more precisely to its coupling configuration 68'; this is accessible through a corresponding passthrough opening 74f on connecting flange 74.

Passthrough opening 74f on connecting flange 74 can be embodied identically to recess 74c. Connecting flange 74 can thus have a greater number of openings 74c than there are pins 80 provided on cover 60. In this case an opening 74c that is not required by a pin 80 for torque-transferring positive engagement can conveniently be used as passthrough opening 74f for connecting supply line 69 to coupling configuration 68'.

In FIG. 6 the embodiment is shown, by way of example, for automated displacement of milling drum 32 by actuator 65 from a preparation position shown in FIG. 6 into the operating position.

A further energy connector line 64', provided for retracting piston rod 63 and present in addition to energy connector line 64 previously described for sliding piston rod 63 out, can likewise be coupled to supply line 69 via a coupling configuration 68' in order to move piston rod 63 out of the extended position shown in FIG. 6 and back into a position retracted farther into hydraulic cylinder 62. Coupling structure 94a is fixedly connected to piston rod 63 by the fact that counterpart release component 90 has been bolted, with internal thread 90c, onto external thread 63b of the piston rod. When piston rod 63, having coupling structure 94a arranged thereon, is moved to the left in FIG. 6 and retracted into hydraulic cylinder 62, coupling structure 94a comes into an installation force-transferring engagement, embodied as an abutting engagement, with counterpart coupling structure 74g in the form of the preferably flat end surface, facing away from drive configuration 46, of bearing stem 74a on connecting flange 74.

Upon retraction of the piston rod starting from the situation shown in FIG. 6, milling drum 32 can be braced in its preparation position axially movably on a substrate, in a manner that is known per se but is not depicted in further detail in FIG. 6, or can simply be slid axially, to a point beyond its center of gravity, onto drive configuration 46.

After completion of the displacement of milling drum 32 into the operating position by actuator 65, piston rod 63 can firstly be moved a little way back in an extension direction, i.e. to the right in FIG. 6, in order to allow counterpart release component 90 to be unscrewed from piston rod 63 without increased energy expenditure due to the installation force-transferring engagement that might possibly still at least partly exist without an extension movement. After counterpart release component 90 is removed from piston rod 63 and stowed on working machine 10, piston rod 63 can be retracted into hydraulic cylinder 62 and, as depicted in FIG. 3, milling drum 32 can be retained by retaining bolt 78 in its operating position against axial displacement by drive configuration 46.

Figure 7:
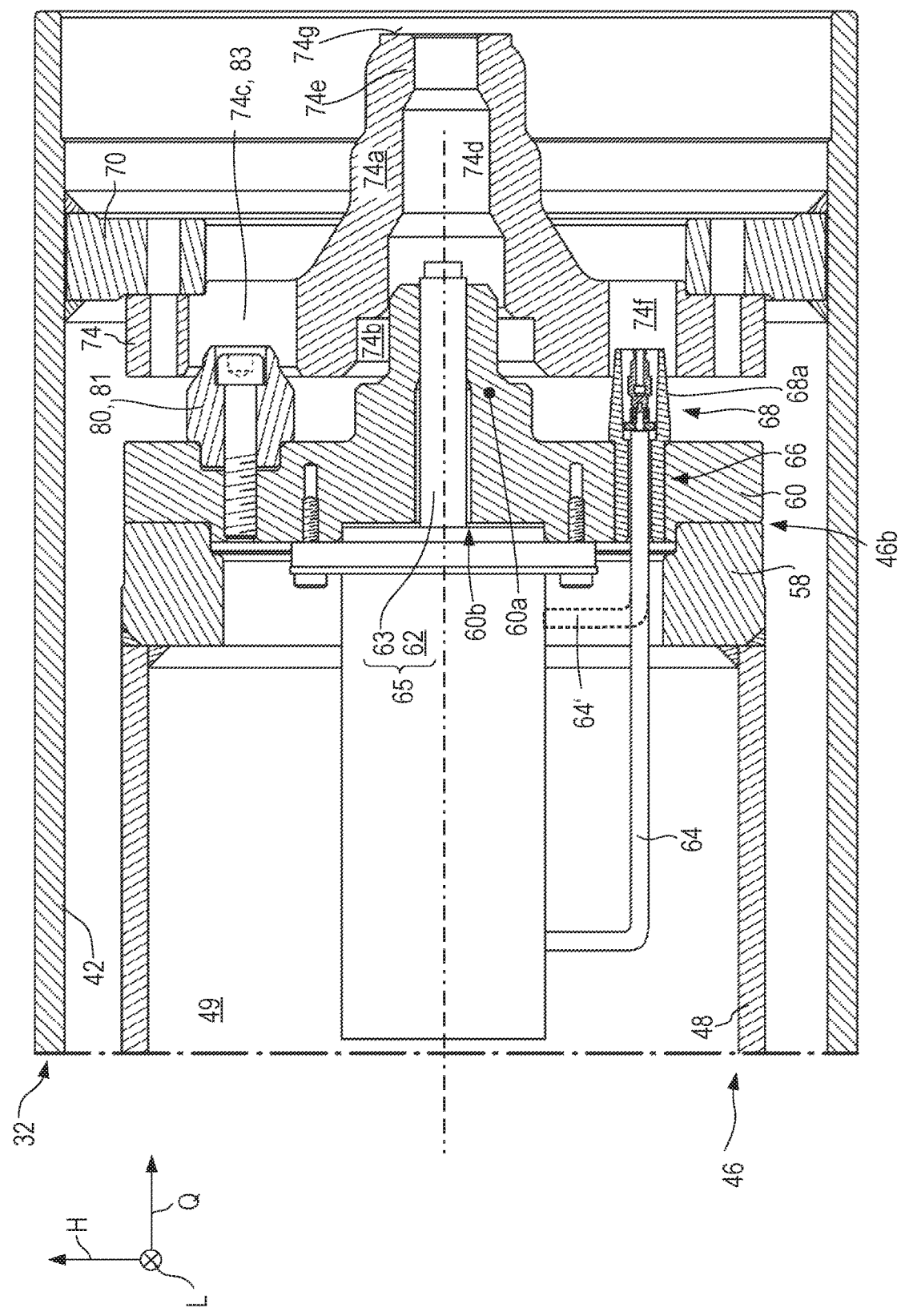
FIG. 7 shows the variant of the first embodiment of the drive configuration and working apparatus according to FIGS. 2 and 3, with the working apparatus in the preparation position.

FIG. 7 shows a further drive configuration 46 having a milling drum 32 arranged thereon in a preparation position. The essential difference between the variants of FIGS. 4 to 6 and of FIG. 7 is simply the embodiment of coupling configuration 68, which corresponds to that of FIG. 2.

Energy connector line 64 or 64', together with sleeve 68a, can be pulled out axially in a direction away from drive configuration 46, i.e. to the right in FIG. 7, in order to make it easier to connect to a supply line 69. Energy connector line 64 or 64' can be pulled, against a spring preload, out of its inactive position (shown in FIG. 7) in sleeve 68a of coupling configuration 68 so that upon cessation of an external force application it moves unassistedly back into the inactive position shown in FIG. 7, where it is radially externally surrounded by sleeve 68a.

Figure 8:
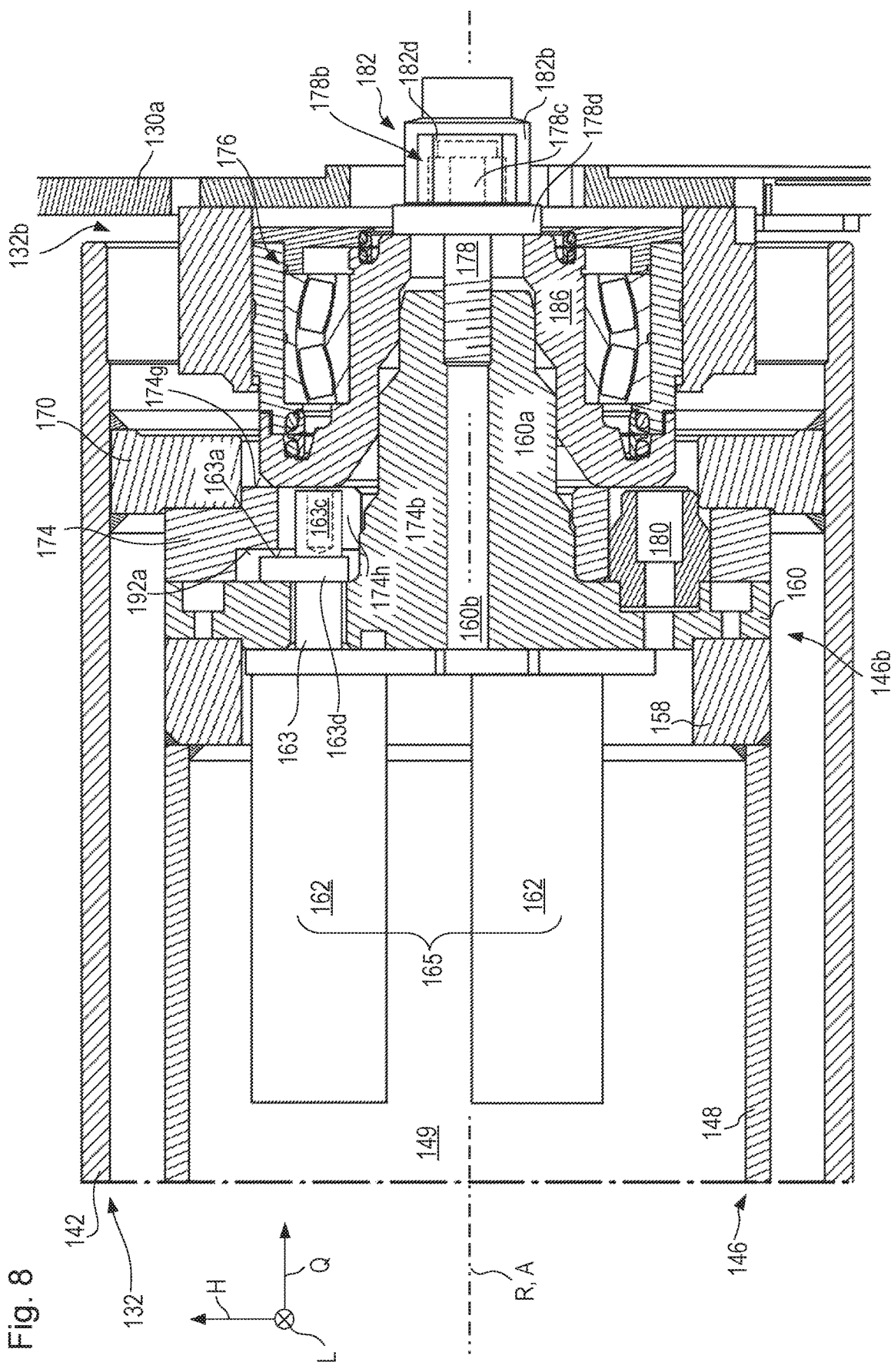
FIG. 8 is a depiction, corresponding to the view of FIG. 3, of a second embodiment of the drive configuration and working apparatus, set up for establishing and/or releasing axial positional retention of the working apparatus.

FIG. 8 shows a second embodiment of the drive configuration and milling drum (working apparatus).

Components and component portions identical and functionally identical to those in the first embodiment are labeled in the second embodiment with the same reference characters but incremented by 100. The second embodiment of FIG. 8 is explained below only insofar as it differs from the first embodiment to an extent essential in terms of the invention.

A first essential modification of the second embodiment as compared with the previously described first embodiment is the conformation of centering stem 160a, which both acts as a centering configuration with respect to connecting flange 174 of milling drum 132 and serves as a bearing stem with respect to non-locating bearing 176.

Counterpart centering configuration 174b is thus once again embodied as a recess. In contrast to the first embodiment, in the second exemplifying embodiment centering stem 160a not only projects axially into connecting flange 174 but passes axially completely through it.

The result, as a consequence of the design, is that retaining bolt 178 can no longer impinge upon connecting flange 174 directly with axial force and displace it into the operating position, or retain milling drum 132 axially in the operating position via connecting flange 174. In the second embodiment, an axial force transfer between retaining bolt 178 and connecting flange 174 connected rigidly to milling drum 132 occurs with interposition of an auxiliary component 186 between bolt head 178b and connecting flange 174. Auxiliary component 186 is advantageously part of non-locating bearing 176, and serves in that context as a bracing component for the inner ring of the rolling bearing of non-locating bearing 176. Auxiliary component 186 is braced firstly against bolt head 178b, and then against connecting flange 174.

In addition, in the second embodiment a central hydraulic cylinder is not provided; instead several, for example three, hydraulic cylinders 162 (in the interest of clarity, only two thereof are completely depicted in FIG. 8, the location of the third hydraulic cylinder being merely indicated) are arranged with a distribution around drive axis A in a circumferential direction and with a (preferably identical) radial spacing from drive axis A. Because each of the hydraulic cylinders 162 now needs to supply only a third of the force originally to be applied by central hydraulic cylinder 162 alone, each of the hydraulic cylinders 162 can advantageously end up being smaller than central hydraulic cylinder 162 of the first embodiment.

Each hydraulic cylinder 162 forms, together with its respective piston rod 163, a sub-actuator as mentioned in the introductory part of the description. All the sub-actuators together in turn constitute actuator 165.

With hydraulic cylinders 162, milling drum 132 can again be moved axially in a direction toward the operating position, preferably into the operating position. Milling drum 132 can likewise be hydraulically moved axially out of the operating position.

Piston rods 163 of the substantially identically embodied sub-actuators 162/163 comprise a radial projection 163d, preferably embodied integrally with piston rod 163, on whose side facing away from drive configuration 146 release configuration 163a is embodied as an abutment surface.

Counterpart release configuration 192a is likewise embodied as an abutment surface, facing in an axial direction toward drive configuration 146, in a shoulder of an actuator passthrough opening 174h in connecting flange 174.

Figure 11:
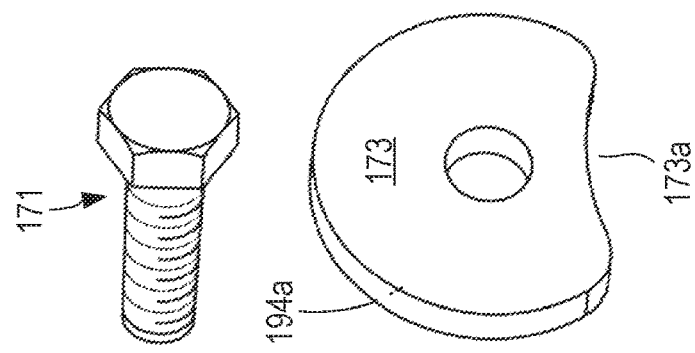
FIG. 11 shows a bolt along with a washer embodying a coupling structure of the second embodiment.

Piston rod 163 comprises, at its longitudinal end located remotely from hydraulic cylinder 162, an internal thread 163c, extending in an axial direction into piston rod 163, to which a coupling structure 194 is connectable. A coupling structure 194 suitable for connection to piston rods 163 of the second embodiment is depicted in FIG. 11. FIG. 11 shows a bolt 171 that can be screwed into internal thread 163c at the free longitudinal end of piston rod 163. The shank of bolt 171 can pass through a washer 173 that is therefore arranged between piston rod 163 and the bolt head of bolt 171.

An end face of washer 173 which, in the assembled state, is located opposite counterpart coupling structure 174g in the form of a flat surface, which at least in portions surrounds actuator passthrough opening 174h, forms coupling structure 192a. By retraction of piston rod 163 from a farther-extended position, this coupling structure 192a can be brought into installation force-transferring engagement (abutting engagement) with counterpart coupling structure 174g, so that as the retraction movement of piston rod 163 into hydraulic cylinder 162 continues, connecting flange 174, and with it milling drum 132, are axially entrained until milling drum 132 reaches its operating position.

Internal threads 163c of piston rods 163 are accessible from outside machine body 13 once non-locating bearing 176 has been removed as intended from stem 160a of cover 160.

As shown in FIG. 11, washer 173 is embodied with a recess 173a into which stem 160a at least partly projects radially when washer 173 is in the attachment state.

Figure 9:
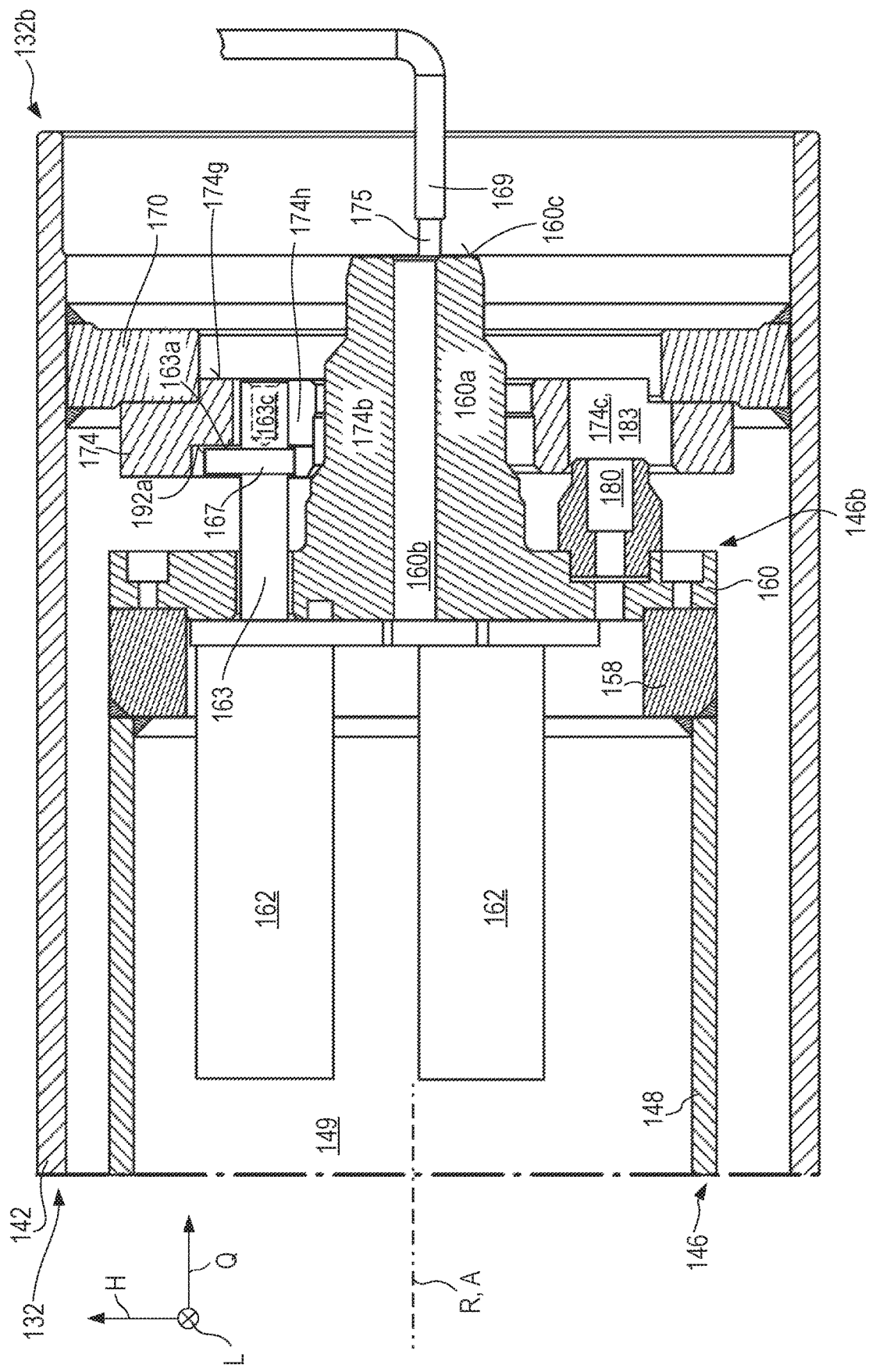
FIG. 9 is a section view, in the section plane XI-XI of FIG. 10, of the drive configuration and working apparatus of FIG. 8 during deinstallation of the working apparatus.

FIG. 9 shows the embodiment of FIG. 8 with milling drum 132 in a preparation position. Because piston rod 163 has been shifted out of hydraulic cylinder 162, release configuration 163a and counterpart release configuration 192a are in abutment against one another and thus in release force-transferring engagement with one another. Continuation of the extension movement of piston rod 163 starting from the position in FIG. 8 has axially shifted milling drum 132, relative to drive configuration 146, into the position shown in FIG. 9.

In contrast to the embodiments shown previously, the energy connector line passes through stem 160a of cover 160, in whose end surface 160c a supply line 169 is connectable, with a counterpart coupling configuration 175, to a prepared coupling configuration (not depicted) in stem 160a of cover 160.

The advantage of embodying the coupling configuration, apparent in FIG. 9 only indirectly by way of counterpart coupling configuration 175, at the protruding longitudinal end of stem 160a of cover 160 is that accessibility of the coupling configuration always exists, since stem 160a of cover 160 also serves to brace the non-locating bearing. End surface 160c is therefore always externally accessible.

Figure 10:
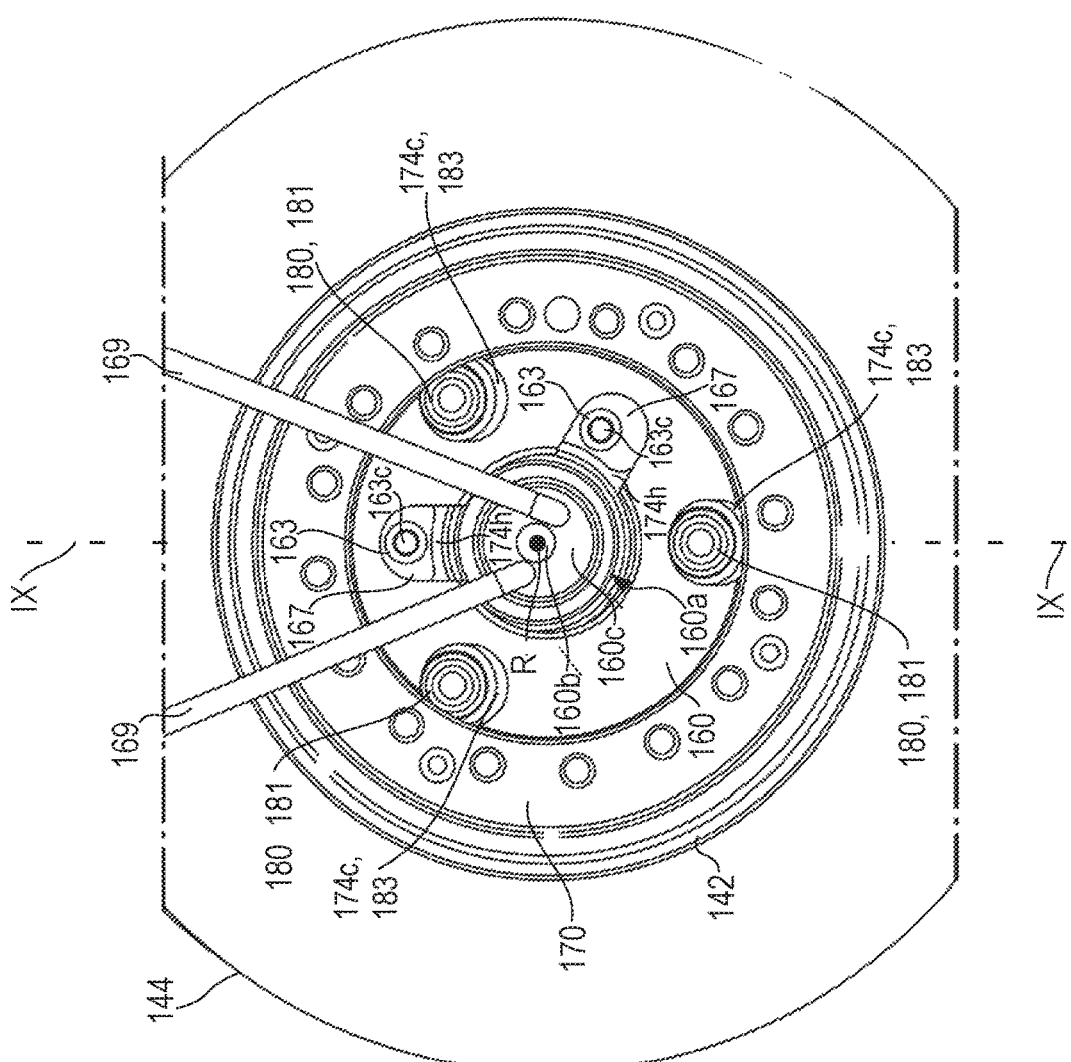
FIG. 10 shows the drive configuration and working apparatus of FIG. 9, viewed in an axial direction.

FIG. 10 is an end view of the embodiment of FIGS. 8 and 9 with two supply lines 169 connected. Each of two hydraulic chambers, acting in opposite directions, of hydraulic cylinder 162 is connected to a respective supply line 169. One supply line 169 is therefore the supply line that slides piston rods 163 out, and the other is the retracting one. The left (in FIG. 10) supply line 169 is located in front of the section plane IX-IX of FIG. 10, so that this line is located in front of the drawing plane of FIG. 9.

Hydraulic supply lines 169 each branch in drive configuration 146 to the respective cylinders, so that each supply line 169 can supply hydraulic fluid to one same-direction chamber of the three double-acting hydraulic cylinders 162.

When double-acting cylinders are used in the drive configuration it is nevertheless advantageous to furnish in the drive configuration an equalization structure that equalizes pressure differences, caused by heating and cooling, in the residual hydraulic fluid that always remains in both pressure chambers in the case of a double-acting cylinder.

Figure 12:
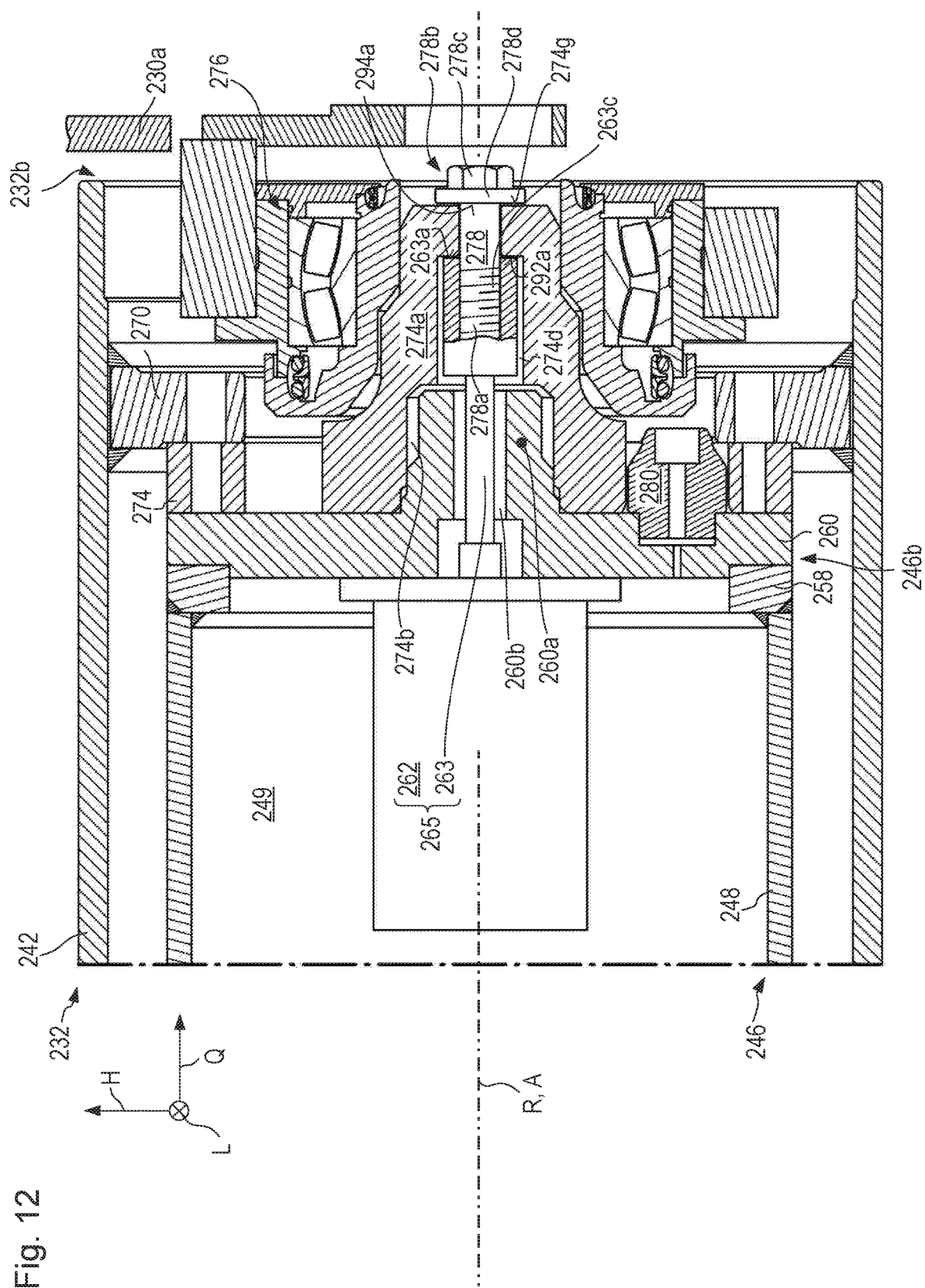
FIG. 12 is a depiction, corresponding to the view of FIG. 3, of a third embodiment of the drive configuration and working apparatus with the working apparatus in the operating position.

Lastly, FIG. 12 depicts a third embodiment that is intended to show that central retaining bolt 278 can also be bolted to piston rod 263 of hydraulic cylinder 262 for axial positional retention of milling drum 32 on drive configuration 46.

Components and component portions identical and functionally identical to those of the first embodiment are labeled in the third embodiment with the same reference characters but incremented by 200. The third embodiment of FIG. 12 will be explained here only insofar as it differs from the first embodiment to an extent essential in terms of the invention.

The third embodiment depicted in FIG. 12, having retaining bolt 278 screwed into piston rod 263, is of course also applicable to the design of the second embodiment in which the centering stem and the bearing stem are implemented in a single component. All that is then necessary is for bolt head 278b to brace against an auxiliary component that transfers force from bolt head 278b onto a component rigidly connected to milling drum 232, as is the case in FIG. 7 with auxiliary component 186. A component that is present in any case, for example a portion of non-locating bearing 276, is once again preferably used as an auxiliary component.

The approach in accordance with the third embodiment as shown in FIG. 12 has the advantage that milling drum 232 can be pulled axially onto the drive configuration and conveyed into the operating position, and also pulled axially off drive configuration 246 and removed from the operating position, using hydraulic cylinder 262. For both installation and deinstallation of milling drum 232, the axial forces required for the axial movement of milling drum 232 are furnished by hydraulic cylinder 262. Axial positional retention with the aforementioned very high torque is once again accomplished, as described in conjunction with FIG. 3, thanks to bolting moment bracing arrangement 82, 182 that interacts with the counterpart bracing component (explained above) on the non-locating bearing side of drive configuration 26 (idle side of earth working machine 10), and with an introduction of torque on the locating bearing side of drive configuration 246 (the drive side, located oppositely from the idle side in transverse machine direction Q, of earth working machine 10) either by internal combustion engine 39 or by a separate rotational drive that, as has already been described above, can be temporarily couplable to a coupling configuration 57 (see FIG. 2) of drive configuration 246 for torque transfer.

That side of radial projection 278d of bolt head 278b of retaining bolt 278 which faces toward threaded shank 278a thus forms a coupling structure 294a.

Retaining bolt 278 can be bolted into internal thread 263c which extends, proceeding from the free longitudinal end of piston rod 263, axially thereinto. An end-side surface, surrounding internal thread 263c and its recess, of piston rod 263 constitutes a release configuration 263a that can be brought into abutting engagement (release force-transferring engagement) with counterpart release configuration 292a of stem 274a of connecting flange 274. Counterpart release configuration 292a is constituted by the annular surface, which faces toward drive configuration 246 when milling drum 232 is in the operating position, around the passthrough opening, through which threaded shank 278a passes, at that longitudinal end of stem 274a which is located remotely from drive configuration 246. The opening diameter of passthrough opening 274d is decreased at the longitudinal end of stem 274a, so that stem 274a forms, at that point, a radially inwardly protruding annular radial projection. That radial projection forms counterpart release configuration 292a on the side facing toward drive configuration 246, and forms counterpart coupling structure 274g on the opposite side.

When retaining bolt 278 is the only positional retention system, hydraulic cylinder 262 must constantly be impinged upon by hydraulic pressure in a retraction direction. A buffer reservoir, which continuously applies pressure to the chamber provided for retracting piston rod 263, can be provided for that purpose in the drive configuration. That buffer reservoir can be connected, like equalization reservoir 67 of FIG. 2, to hydraulic cylinder 262, except that for the embodiment of FIG. 12 the buffer reservoir will have different dimensions and operating parameters from equalization reservoir 67 because its purpose is different. The pressure in the buffer reservoir can be established and maintained by the rotation of milling drum 232.

In a departure from what is depicted in FIG. 12, piston rod 263 can have over its entire length a constant thickness or constant diameter that is then determined by the diameter of the longitudinal end, intended for screwing in retaining bolt 278, of piston rod 163 shown in FIG. 12.

Alternatively, in order to relieve stress on hydraulic cylinder 262 during operating phases of milling drum 232, milling drum 232 can be retained, in its operating position, on drive configuration 246 by way of one or preferably several decentralized retaining bolts.

The invention claimed is:

1. An earth working machine, comprising:
   a machine frame;
   a drive configuration rotatable relative to the machine frame about a drive axis, the drive axis defining an axial direction;
   a working apparatus releasably connectable to the drive configuration in an operating position wherein rotation of the drive configuration transfers torque to the working apparatus for rotation of the drive configuration and the working apparatus together about the drive axis for earth working, the working apparatus being configured such that when a connection between the working apparatus and the drive configuration is released the working apparatus is removable from the operating position in an axial direction relative to the drive configuration for deinstallation of the working apparatus from the drive configuration, and the working apparatus being configured such that the working apparatus is conveyable into the operating position in an axial direction relative to the drive configuration for installation of the working apparatus on the drive configuration; and an actuator mounted on the drive configuration and including an actuator member movable relative to the drive configuration into installation force transferring engagement with the working apparatus when the working apparatus is in a preparation position located axially remotely from the operating position, the actuator being configured to move the working apparatus from the preparation position closer to the operating position.

2. The earth working machine of claim 1, wherein:
the actuator includes a coupling structure removably connectable to the actuator member, the coupling structure being configured to provide the installation force transferring engagement with a counterpart coupling structure of the working apparatus.

3. The earth working machine of claim 1, wherein:
the working apparatus is conveyable by the actuator from the preparation position into the operating position.

4. The earth working machine of claim 1, wherein:
the working apparatus in both its operating position and its preparation position, radially externally surrounds the drive configuration.

5. The earth working machine of claim 1, wherein:
the actuator member is axially translationally movable relative to the drive configuration between a retracted position and an extended position.

6. The earth working machine of claim 5, further comprising:
the actuator including a coupling structure removably connectable to the actuator member, the coupling structure being configured to provide the installation force transferring engagement with a counterpart coupling structure of the working apparatus; and
a component portion rigidly connected to the working apparatus, the component portion having an actuator passthrough opening defined therein, the counterpart coupling structure being defined on the component portion adjacent to the actuator passthrough opening; wherein the actuator member passes through the actuator passthrough opening at least in the extended position.

7. The earth working machine of claim 6, wherein:
the counterpart coupling structure surrounds the actuator passthrough opening.

8. The earth working machine of claim 5, wherein:
the actuator member includes a release configuration movable by axial movement of the actuator member relative to the drive configuration into release force transferring engagement with a counterpart release configuration of the working apparatus such that the working apparatus is displaceable by the actuator out of the operating position upon establishment of the release force transferring engagement.

9. The earth working machine of claim 8, wherein:
the actuator member is movable from the retracted position toward the extended position into the release force transferring engagement.

10. The earth working machine of claim 8, further comprising:
a counterpart release component removably connectable to the working apparatus, the counterpart release configuration being defined on the counterpart release component.

11. The earth working machine of claim 10, wherein:
the actuator includes a coupling structure configured to provide the installation force transferring engagement with the working apparatus, the coupling structure being defined on the counterpart release component.

12. The earth working machine of claim 1, wherein:
the drive configuration includes a hollow tubular body including a cover, the cover having an energy passthrough opening defined therein; and
further comprising an energy connector line connected to the actuator and accessible at or through the energy passthrough opening.

13. The earth working machine of claim 12, wherein:
the drive configuration includes a drive torque-transferring positively engaging coupling arrangement for drive torque-transferring positive coupling to a counterpart coupling arrangement of the working apparatus; and
the energy passthrough opening is embodied in the drive torque-transferring positively engaging coupling arrangement.

14. The earth working machine of claim 13, wherein:
the drive torque-transferring positively engaging coupling arrangement is located in a region of a longitudinal end of the drive configuration located opposite from a site where drive torque is introduced into the drive configuration.

15. The earth working machine of claim 12, wherein:
the drive configuration includes a centering configuration located at a longitudinal end of the drive configuration located opposite from a site where drive torque is introduced into the drive configuration; and
the working apparatus includes a counterpart centering configuration configured for positive centering engagement with the centering configuration of the drive configuration.

16. The earth working machine of claim 15, wherein:
the energy passthrough opening is defined in the centering configuration.

17. The earth working machine of claim 15, wherein:
the actuator member passes through the centering configuration.

18. The earth working machine of claim 12, wherein:
the energy connector line includes a remote end located remotely from the actuator, and a coupling connected to the remote end and configured for energy-transferring coupling to a counterpart coupling of a supply line.

19. The earth working machine of claim 12, wherein:
the energy connector line includes a remote end located remotely from the actuator, the remote end being configured to be pulled out of the drive configuration through the energy passthrough opening in a direction away from the actuator.

20. The earth working machine of claim 19, wherein:
the energy connector line is configured such that the remote end is pullable against a returning preload.

21. The earth working machine of claim 1, wherein the actuator is a hydraulic actuator.

22. The earth working machine of claim 1, wherein the actuator is an electromechanical actuator.

23. The earth working machine of claim 1, further comprising:
a central bolt having a bolt axis coaxial with the drive axis, the central bolt axially retaining the working apparatus in its operating position on the drive configuration.

* * * * *